(12) United States Patent
Ujiie

(10) Patent No.: US 9,444,980 B2
(45) Date of Patent: Sep. 13, 2016

(54) ELECTRONIC APPARATUS AND IMAGING APPARATUS

(71) Applicant: CANON KABUSHIKI KAISHA, Tokyo (JP)

(72) Inventor: Hirotaka Ujiie, Kawasaki (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 0 days.

(21) Appl. No.: 14/310,275

(22) Filed: Jun. 20, 2014

(65) Prior Publication Data

US 2015/0002721 A1     Jan. 1, 2015

(30) Foreign Application Priority Data

Jul. 1, 2013  (JP) ................................. 2013-137846
Jul. 18, 2013 (JP) ................................. 2013-149671

(51) Int. Cl.
*H04N 5/225* (2006.01)
*G03B 13/02* (2006.01)
*G03B 17/04* (2006.01)
*H04N 5/232* (2006.01)

(52) U.S. Cl.
CPC .......... *H04N 5/2251* (2013.01); *G03B 13/02* (2013.01); *G03B 17/04* (2013.01); *H04N 5/23293* (2013.01); *G03B 2217/002* (2013.01)

(58) Field of Classification Search
CPC ............. H04N 5/2251; H04N 5/2252; H04N 5/23293; G03B 13/02; G03B 17/04; G03B 2217/002
USPC ..................................................... 348/333.06
See application file for complete search history.

(56) References Cited

U.S. PATENT DOCUMENTS

| | | | | |
|---|---|---|---|---|
| 5,742,341 A | * | 4/1998 | Ohishi | H04N 5/2252 348/333.06 |
| 5,822,023 A | * | 10/1998 | Suman | B60R 7/04 348/837 |
| 6,115,069 A | * | 9/2000 | Kuroki | H04N 5/2251 348/373 |
| 7,447,009 B2 | * | 11/2008 | Wang | H04M 1/0216 348/333.06 |
| 7,515,826 B2 | * | 4/2009 | Shibayama | H04N 5/2251 348/333.06 |
| 7,762,627 B2 | * | 7/2010 | Chang | B60R 11/0235 297/217.1 |
| 2008/0298782 A1 | * | 12/2008 | Lee | G11B 33/025 386/361 |
| 2010/0060747 A1 | * | 3/2010 | Woodman | G03B 17/02 348/222.1 |
| 2010/0149439 A1 | * | 6/2010 | Chiba | H04N 5/23293 348/836 |

FOREIGN PATENT DOCUMENTS

JP          3687163 B       8/2005
JP        2012-134814 A     7/2012

\* cited by examiner

*Primary Examiner* — Daniel M Pasiewicz
(74) *Attorney, Agent, or Firm* — Fitzpatrick, Cella, Harper & Scinto

(57) ABSTRACT

A video camera includes a camera body provided with an opening; a panel unit configured to be pivotable with respect to the camera body between a use position and a storage position; and a lid configured to be pivotable with respect to the opening so as to open/close a battery box. The opening is provided on a surface adjacent to a storage position against which the bottom of the panel unit is brought into abutment at the storage position. The panel unit overhangs a surface in which the opening is provided by the pivot of the panel unit from the storage position to the use position, and the lid pivots relative to the opening to a position which does not interfere with the panel unit so as to open the opening.

9 Claims, 28 Drawing Sheets

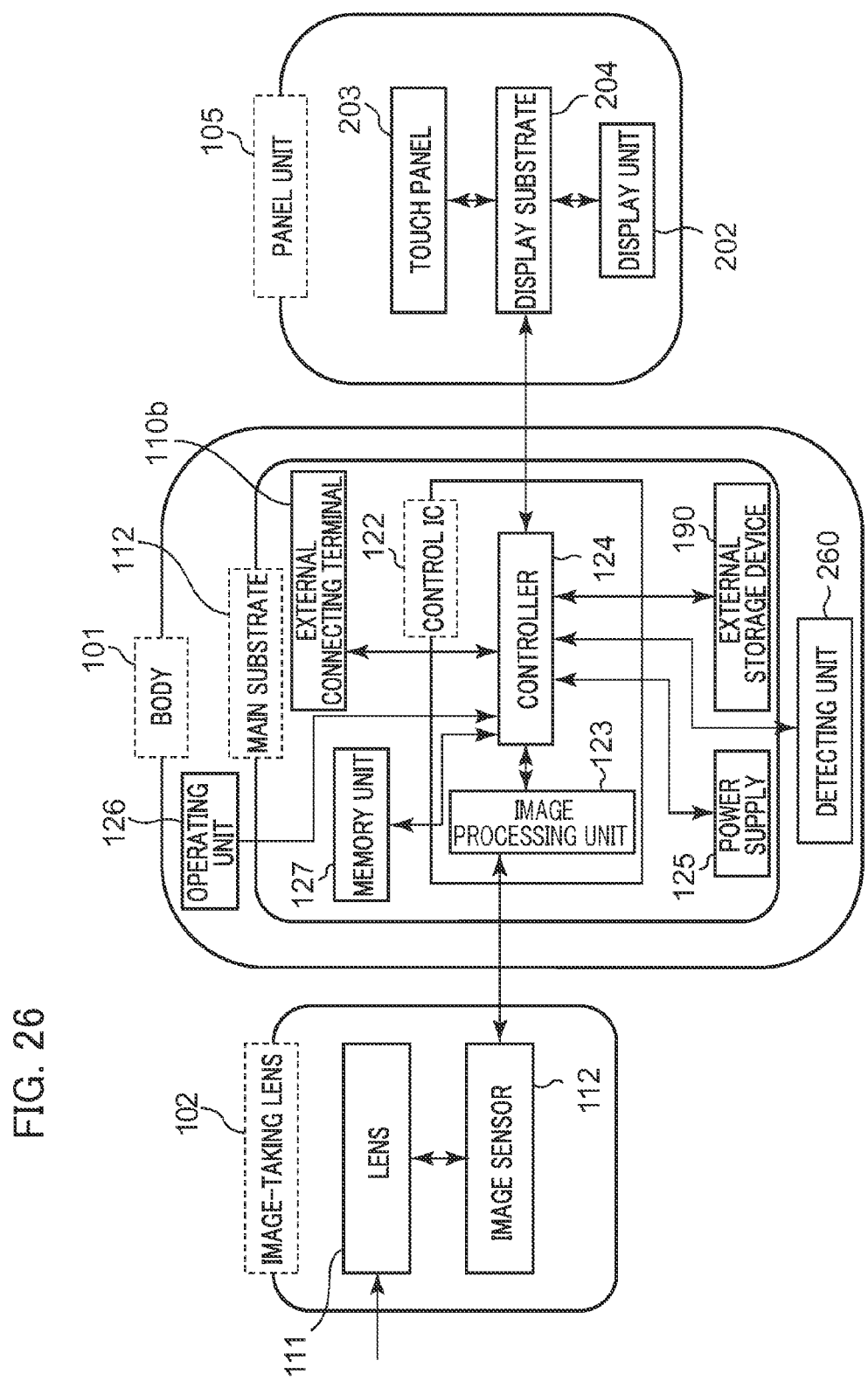

ELECTRONIC APPARATUS AND IMAGING APPARATUS

BACKGROUND OF THE INVENTION

1. Field of the Invention

The present invention relates to an electronic apparatus and an imaging apparatus.

2. Description of the Related Art

There has been proposed an imaging apparatus that includes a memory card storage for removably storing a memory card in which data of a shot image is recorded and a battery storage for removably storing a battery within the storage thereof. There has also been proposed an electronic apparatus in which a lid is provided on the storage in order to protect a battery and a memory card from dust or the like and which is capable of performing insertion/removal of the battery and the memory card in a lid opened state. There has also been increasing opportunity to perform self-shooting in order to bring himself to be viewed by others through SNS or the like.

Japanese Patent Laid-Open No. 2012-134814 discloses an imaging apparatus that includes a display unit configured to be rotated so as to be openable and closable with respect to a camera body and is capable of directing the display unit in a direction suitable for the user's shooting attitude. Japanese Patent No. 3687163 discloses an imaging apparatus that rockably supports a video display device with respect to the rear side of the body so as to permit a display screen on which the video is displayed to be tiltable in upper and lower directions and is capable of self-shooting such that the display screen on which the video is displayed is pointed toward the front side of the body.

In the imaging apparatus including a display unit which is rotated so as to be openable and closable with respect to a camera body, the display unit may interfere with the lid of the storage, such as a card cover, a battery lid, or the like when the display unit is rotated to its opened state (state where the display unit is in a use position). Consequently, the lid may be deformed or damaged or the display unit may be damaged.

Since the imaging lens and the display surface of the video display device overlap in projection in the conventional technique disclosed in Japanese Patent No. 3687163, the thickness of the video display device in the display surface direction increases, resulting in an increase in size of the entire imaging apparatus. When the display screen is directed forwards upon self-shooting, a weight balance may be disrupted. In addition, it may be difficult to perform self-shooting in a state where the imaging apparatus is gripped by himself. When the display device is a touch panel type display device, it is difficult to handle the display device upon operation of icons displayed thereon and a plurality of operations needs to be carried out until the display device is directed in a direction for self-shooting.

SUMMARY OF THE INVENTION

The present invention provides an electronic apparatus that includes a display unit configured to be pivotable with respect to a body between a use position and a storage position and a lid configured to be pivotable with respect to the opening so as to open/close the opening and is capable of avoiding interference between the display unit and the lid in a state where the display unit is in a use position. The present invention also provides an imaging apparatus including a display unit which can realize thinning of the body, improve operability of the body including the display unit and of which the angle may be changed in various ways.

According to an aspect of the present invention, an electronic apparatus is provided that includes a body provided with an opening; a display unit configured to be pivotable with respect to the body between a use position and a storage position; and a lid configured to be pivotable with respect to the opening so as to open/close the opening. The opening is provided on a surface adjacent to a storage position against which the bottom of the display unit is brought into abutment at the storage position. The display unit overhangs a surface in which the opening is provided by the pivot of the display unit from the storage position to the use position, and the lid pivots relative to the opening to a position which does not interfere with the display unit overhanging the surface in which the opening is provided so as to open the opening.

According to the present invention, the electronic apparatus that is capable of avoiding interference between the display unit and the lid in a state where the display unit pivots relative to the body so as to be in a use position may be provided. In addition, an imaging apparatus including a display unit which can realize thinning of the body, improve operability of the body including the display unit and of which the angle may be changed in various ways may be provided.

Further features of the present invention will become apparent from the following description of exemplary embodiments with reference to the attached drawings.

BRIEF DESCRIPTION OF THE DRAWINGS

FIGS. 25A and 26B are diagrams illustrating a state where both a battery lid and a panel unit are opened.

FIG. 26 is a functional configuration diagram of an imaging apparatus.

DESCRIPTION OF THE EMBODIMENTS

First Embodiment

Figure 1A:
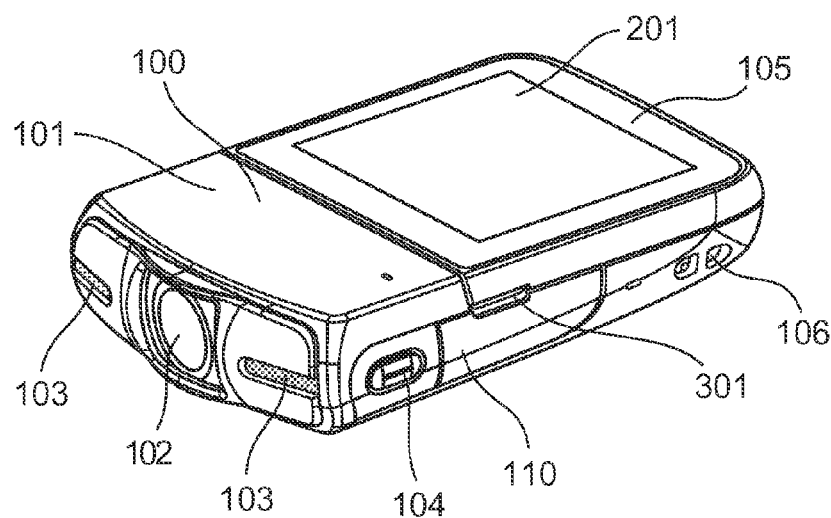
FIGS. 1A and 1B are diagrams illustrating an exemplary configuration of the imaging apparatus of the present embodiment.
Figure 1B:
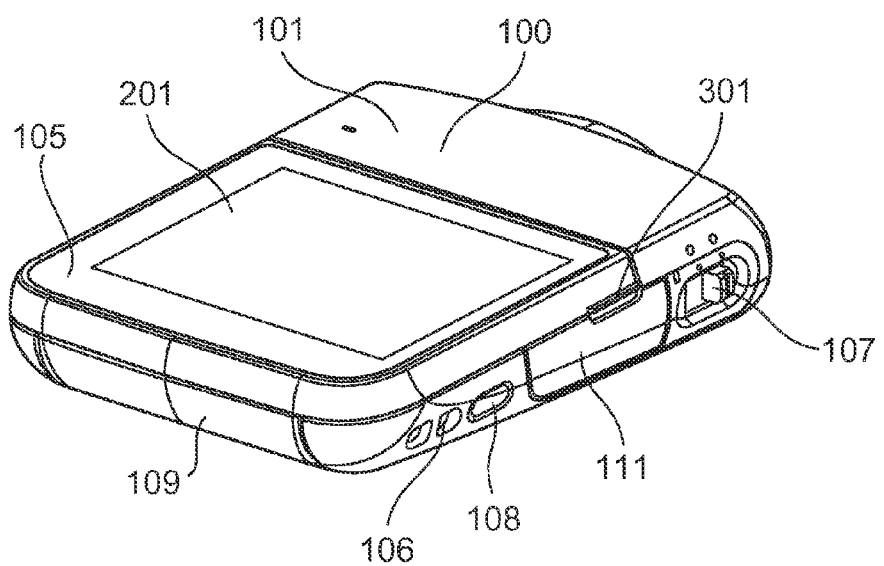
Figure 2A:
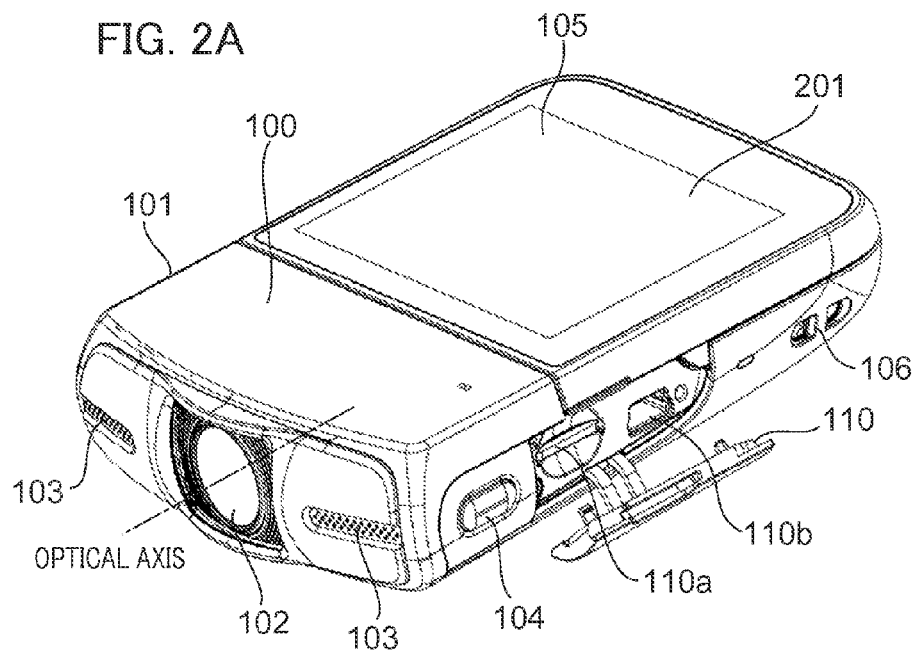
FIGS. 2A and 2B are diagrams illustrating an exemplary configuration of the imaging apparatus of the present embodiment in a lid opened state.
Figure 2B:
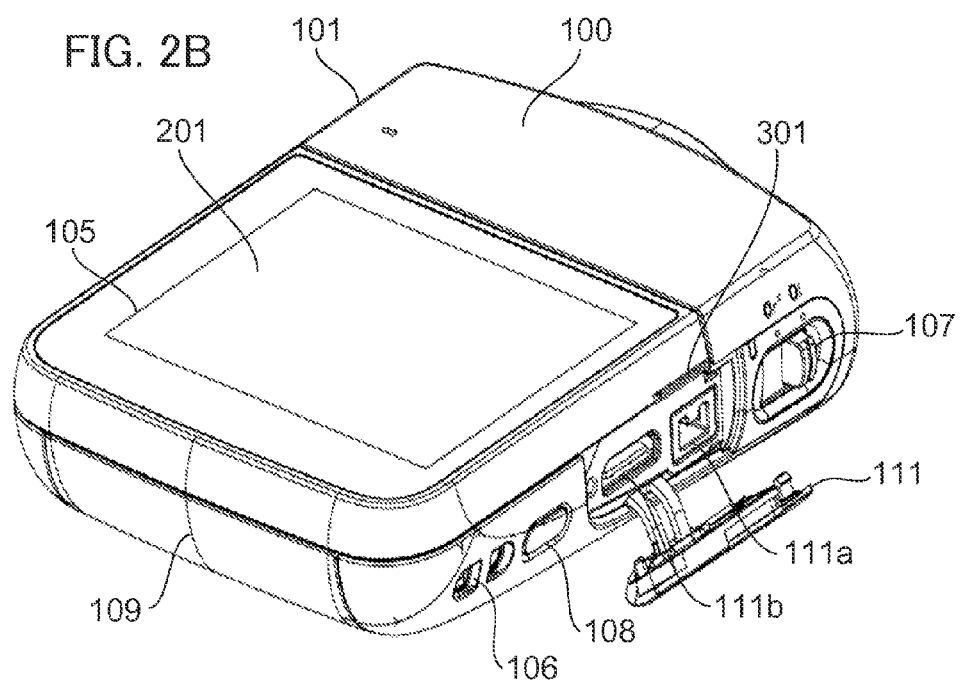

Each of FIGS. 1A to 2B is a diagram illustrating an exemplary configuration of the electronic apparatus (imaging apparatus 100) of the present embodiment. Each of FIGS. 1A and 2A is a perspective view illustrating a front-view configuration of the electronic apparatus. In FIG. 2A, a lid provided on the left side of the electronic apparatus is opened. Each of FIGS. 1B and 2B is a perspective view illustrating rear-view configuration of the electronic apparatus. In FIG. 2B, a lid provided on the right side of the electronic apparatus is opened. In the example shown in FIGS. 1A to 2B, a video camera which is an exemplary imaging apparatus functions as the electronic apparatus of the present embodiment.

A camera body 101 of the imaging apparatus 100 is a video camera body. The camera body 101 includes an image-taking lens 102, a microphone 103, a release button 104, a panel unit 105, a strap pin 106, and finger grip projections 301. The image-taking lens 102 is a lens unit for shooting an object. The microphone 103 records a voice message. The release button 104 is a button for instructing the start of still image shooting.

The panel unit 105 is a display panel on which a captured image is displayed and has a display surface 201. The strap pin 106 is a pin for securing a strap.

The camera body 101 also includes a power switch 107, a reproduce button 108, and a battery lid 109. The power switch 107 is a switch for activating the camera body 101. The reproduce button 108 is a button for switching to the operation mode for reproducing the recorded video. The battery lid 109 is provided on the rear side of the camera body 101 and opens/closes upon removal of a battery.

A left side lid 110 is provided on the left side of the camera body 101. When the left side lid 110 is opened, a memory card slot 110a and an USB jack 110b are provided. The memory card slot 110a is a slot into which a memory card serving as a recording medium is insertable. The USB jack 110b is a jack into which a USB cable connectable to a PC (Personal Computer) or the like is insertable.

A right side surface lid 111 is provided on the right side surface of the camera body 101. When the right side surface lid 111 is opened, a DC jack 111a and an HDMI (registered trademark) jack 111b are provided. The DC jack 111a is a jack into which a DC cable which can provide power supply is insertable. The HDMI (registered trademark) jack 111b is a jack into which an HDMI (registered trademark) cable which can output a captured image to the outside is insertable. In the present embodiment, a direction in which the image-taking lens 102 is disposed along the optical axis is defined as the front of the body, and a direction in which the battery lid 109 is disposed along the optical axis is defined as the rear of the body. As shown in FIGS. 1A to 2B, a state in which the panel unit 105 is closed with respect to the camera body 101 is defined as the "stored state", and the position of the panel unit 105 in the stored state is defined as the "storage position".

Figure 3:
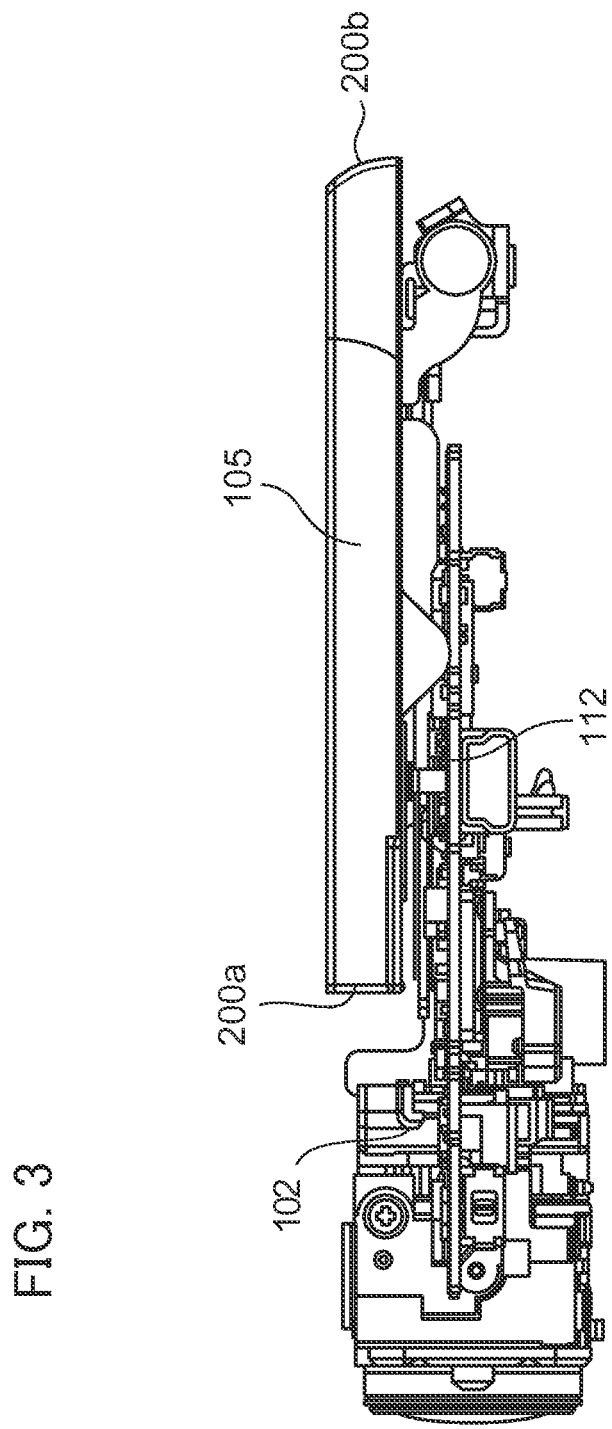
FIG. 3 is a diagram illustrating an exemplary internal configuration of the imaging apparatus.

FIG. 3 is a side view illustrating the image-taking lens 102, the main substrate 112, and the panel unit 105 of the imaging apparatus 100 according to the present embodiment. When the imaging apparatus 100 is viewed from the side of the body, the image-taking lens 102 and the panel unit 105 are disposed at positions so as not to be overlapped with each other in projection along the thickness direction (vertical direction in FIG. 4) of the imaging apparatus 100 in a stored state where the panel unit 105 is stored in a predetermined position. This arrangement enables to make the thickness of the imaging apparatus 100 thin, resulting in an improvement in portability. Here, the panel unit 105 has a first end 200a which is provided on the side where the image-taking lens 102 is disposed in an image-taking orientation in the stored state where the panel unit 105 is stored in a predetermined position, and a second end 200b which is provided on the side opposite to the image-taking lens 102.

Figure 4:
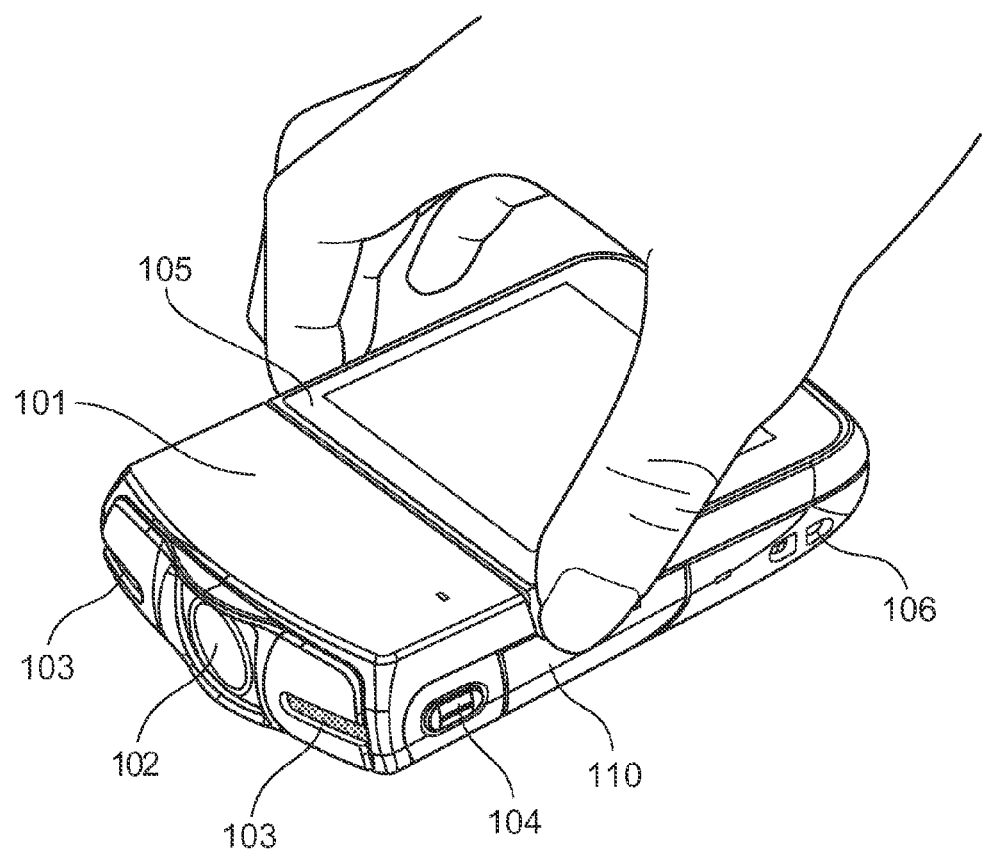
FIG. 4 is a forward perspective view illustrating an imaging apparatus in a state where the panel unit thereof is being opened by a photographer.

In the imaging apparatus 100 according to the present embodiment, the operator can pivot the panel unit 105 in the stored state by lifting it up such that both sides of the front side surface of the panel unit 105 are nipped with the fingers of one hand of the operator as shown in FIG. 4. As shown in FIGS. 1A to 2B, both left and right sides of the panel unit 105 are provided with the finger grip projections 301 so as to allow the operator to readily lift the panel unit 105 up. The finger grip projections 301 are disposed at positions away from a connecting portion 220 to be described below, so that the panel unit 105 can be readily opened or closed with a small force. Note that the finger grip projections 301 are provided in the range so as not to fall outside the external shape of the imaging apparatus 100.

Figure 5A:
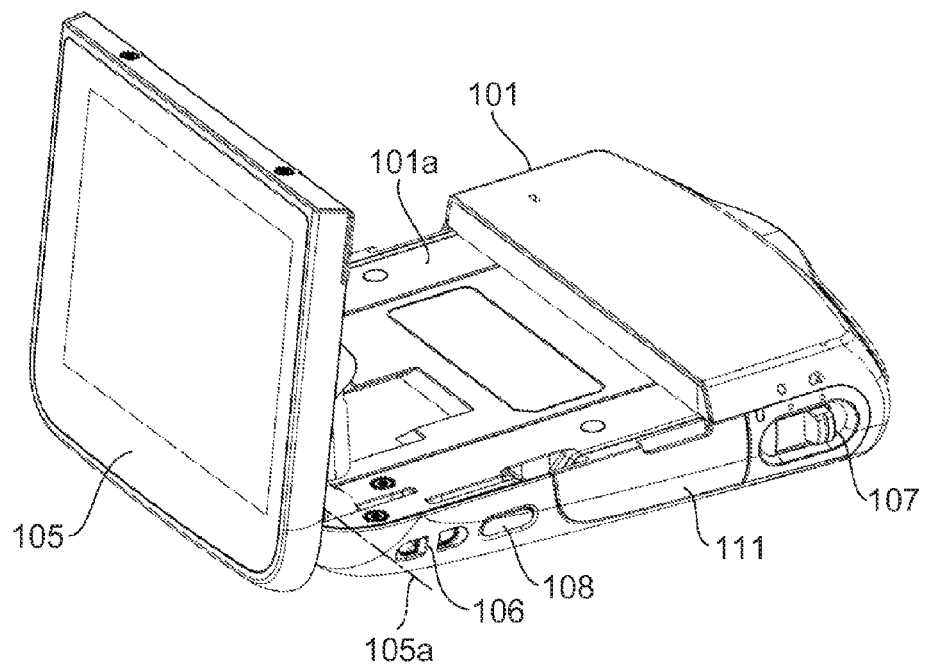
FIGS. 5A and 5B are diagrams illustrating the operation of the panel unit.

FIGS. 5A to 8B are diagrams illustrating the operations of a panel unit. FIG. 5A illustrates a state in which the panel unit 105 is opened by pivoting it with respect to the camera body 101. In the present embodiment, this state is defined as a "use state". The attitude of the panel unit 105 in the use state is defined as a "normal shooting attitude". The position of the panel unit 105 in the use state is defined as a "use position".

Figure 5B:
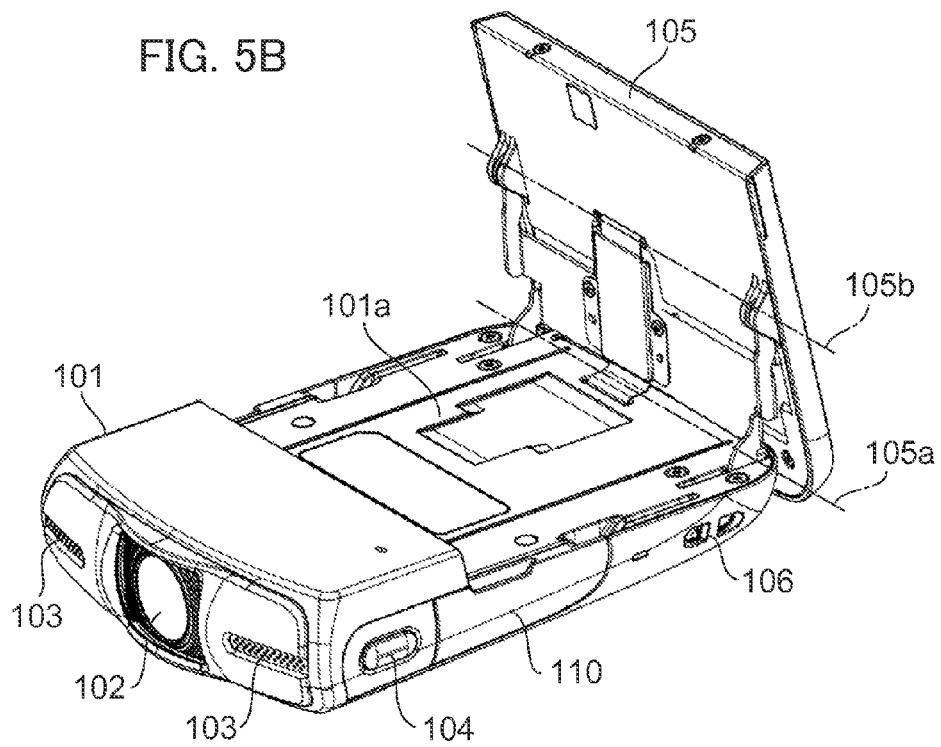
Figure 6A:
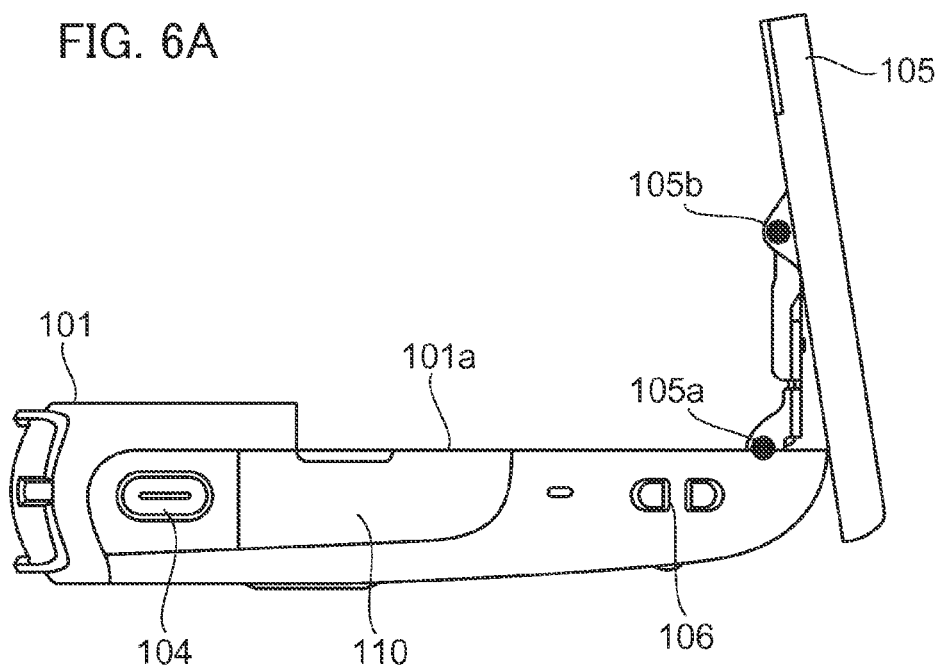
FIGS. 6A and 6B are diagrams illustrating the operation of the panel unit.

FIG. 5B is a perspective view illustrating the front of a video camera in the use state. FIG. 6A is a side view illustrating the left side of the video camera in the use state. The panel unit 105 is connected to the camera body 101 via a hinge unit 210. The hinge unit 210 has a rotatable two-axial hinge portion (connecting portion) and is connected to the camera body 101 via a first connecting portion 220 such that a first rotary shaft 105a of the first connecting portion 220 is disposed at the rear of the body. The hinge unit 210 is also connected to the panel unit 105 via a second connecting portion 230 such that a second rotary shaft 105b of the second connecting portion 230 is disposed upper than the center of the panel unit 105. The second connecting portion 230 protrudes from the panel unit 105 toward the camera body 101. Thus, a cover portion 235 is configured to cover the second connecting portion 230. A storage surface 101a is a surface for storing the panel unit 105.

When the panel unit 105 rotates about the first rotary shaft 105a from the stored state shown in FIG. 1A, the display surface of the panel unit 105 moves rearward, so that the panel unit 105 is in the normal shooting attitude as shown in FIGS. 5A to 6A. In other words, the panel unit 105 functions as a display unit that is pivotable with respect to the camera body 101 between the use position and the storage position. At this time, a part of the panel unit 105 overhangs rearward. More specifically, the panel unit 105 overhangs a surface adjacent to the storage surface 101a against which the backside of the panel unit 105 of the camera body 101 is brought into abutment in the stored state. This enables to realize an expansion of the rotation angle and an increase in size of the panel unit 105.

Here, the opening ("O" in the drawing) of the battery box 120 which functions as a storage for storing a battery is provided in a surface adjacent to the storage surface 101a as is described below. The video camera is configured such that the battery lid 109 for opening/closing the opening does not interfere with the panel unit 105 in the normal shooting attitude.

Figure 6B:
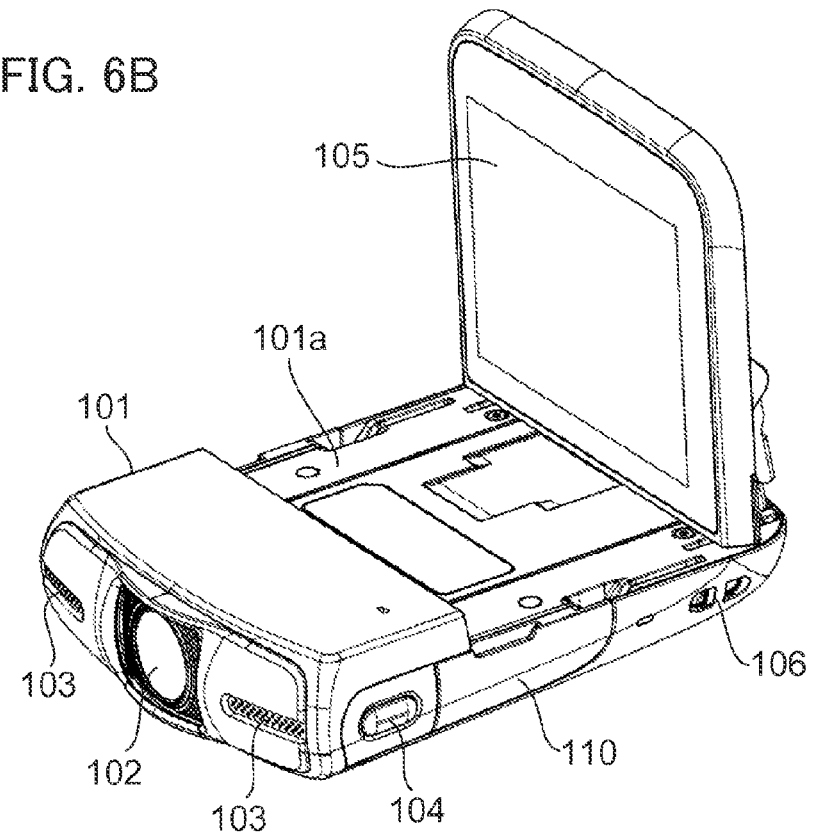
Figure 7A:
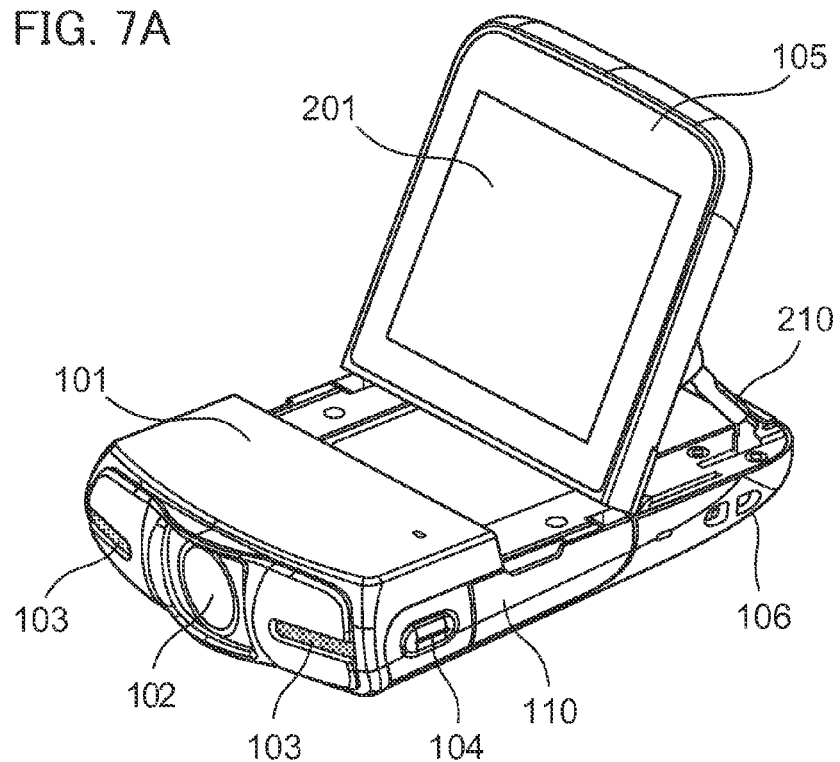
FIG. 7A is a forward perspective view and FIG. 7B is a side view, each illustrating an imaging apparatus in a state where the panel unit thereof is directed in a front obliquely upward direction.
Figure 7B:
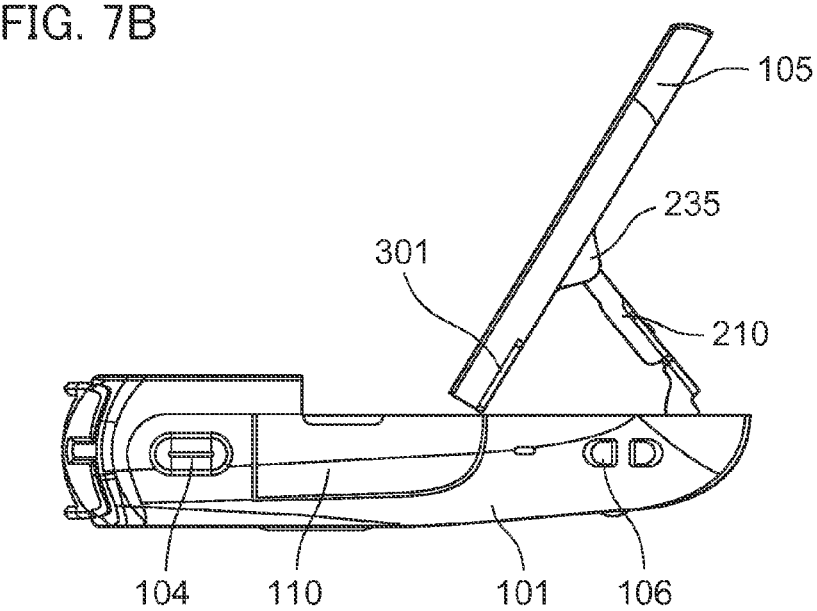

When the panel unit 105 is rotated from the normal shooting attitude about the second rotary shaft 105b in the counter-clockwise direction in the state shown in FIG. 6A, the panel unit 105 is directed toward an object direction, and thus, is in the self-shooting attitude shown in FIG. 6B. The self-shooting attitude is an attitude which is mainly used for self-shooting. When the panel unit 105 is in the self-shooting attitude, the user can perform self-shooting while viewing the display surface of the panel unit 105 and confirming an angle of view.

The imaging apparatus 100 according to the present embodiment has a thin shape adapted to the panel unit 105, and thus, the ratio of the bottom area of the camera body 101 to the volume of the imaging apparatus 100 is high. As shown in FIGS. 5A to 8B, the movable range of the panel unit 105 does not largely fall outside the outer shape of the ground plane of the camera body 101. The display surface 201 of the panel unit 105 is a touch panel. The display surface 201 is disposed on the upper surface side of the body, the imaging apparatus 100 is easy to use with an improvement in operability of the touch panel as compared to that of the conventional horizontally-hinged type imaging apparatus. Thus, stable shooting can be performed even when the panel unit 105 is inclined at any angle.

The first connecting portion 220 of the present configuration is disposed at two locations at both ends on the side on which the image-taking lens 102 in the camera body 101 is provided and the side opposite thereto. Two first connecting portions 220 are disposed such that the rotational degree of freedom of the panel unit 105 is increased, the stability of the panel unit 105 is increased upon handling, and the internal compositions of the camera body 101 are not interrupted thereby. As in the first connecting portions 220, the second connecting portion 230 of the panel unit 105 is also disposed at two locations on both sides of the panel unit 105 in order to increase the rotational degree of freedom of the panel unit 105 and the stability thereof upon handling.

Figure 9:
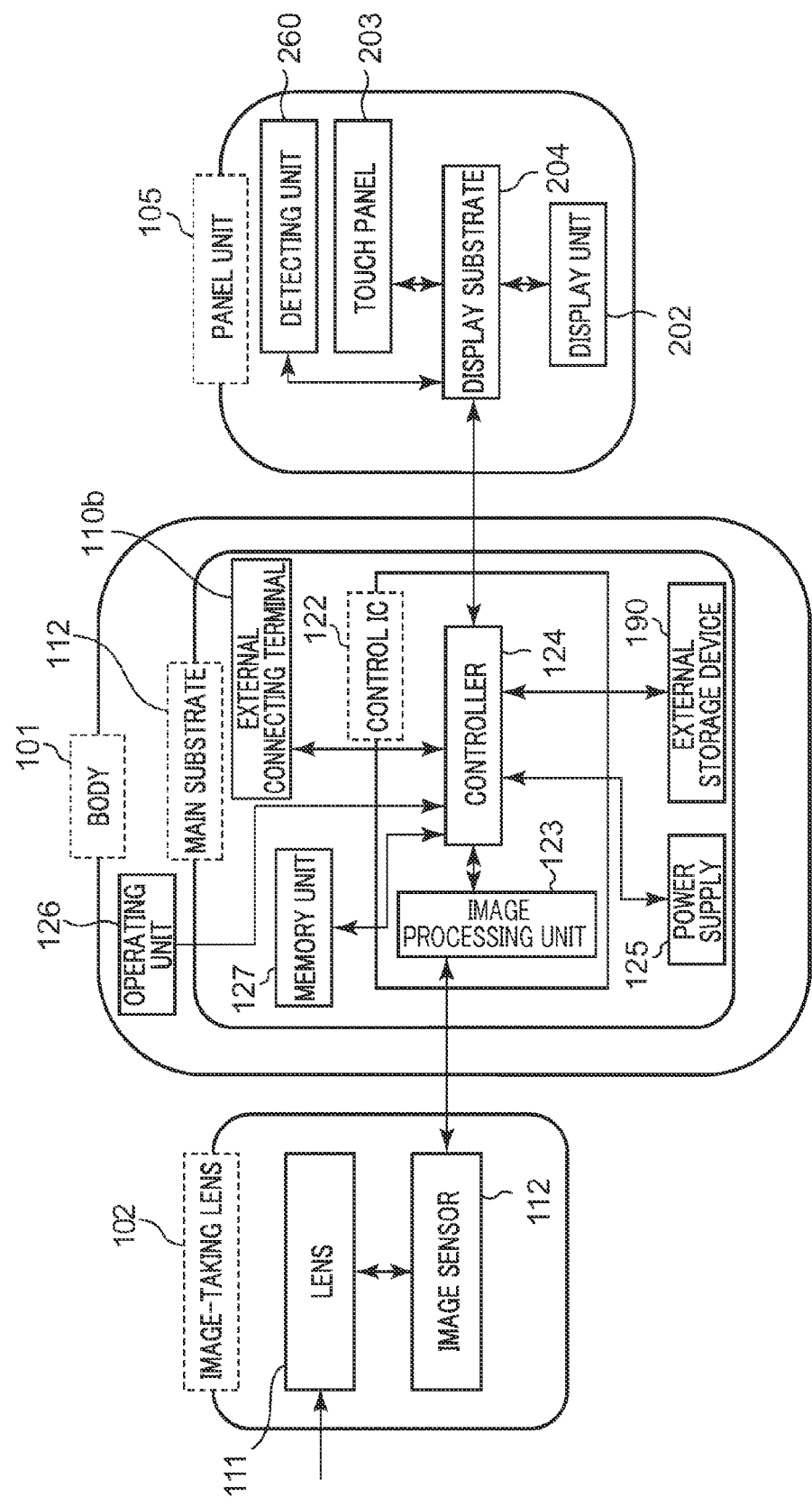
FIG. 9 is a functional configuration diagram of an imaging apparatus.

FIG. 9 is a block diagram illustrating a functional configuration of the imaging apparatus 100 according to the present embodiment. An object image incident on a lens 111 of the image-taking lens 102 is converted into an image signal and then is output from an image sensor 112. The output image signal is sent to the main substrate 112 disposed on the camera body 101, and then is input to a control IC 122 mounted on the main substrate 112. The control IC 122 of the camera of the present embodiment is constituted by an image processing unit 123 that converts an image signal sent from the image sensor 112 into digital image data such as a brightness signal and a color difference signal and a controller 124 provided with a CPU and a work memory.

Digital image data converted by the image processing unit 123 is exchanged with a memory unit 127 serving as a work area under control of the controller 124, and then is output to an external storage device 190 or an external connection terminal 110b. The external storage device used herein refers to a storage device which can be built in the body or is removable therefrom, such as a memory card, an HDD, or the like. A power supply 125 turns the power supply of the imaging apparatus 1000N/OFF via the controller 124 by operating a power switch or the like. When an operating unit 126 is operated, each of the functions assigned to the operating unit 126 is executed under control of the controller 124.

The panel unit 105 can display a captured object image, a video stored in the external storage device 190, and the like. The panel unit 105 has a display unit 202 which displays a video, a touch panel 203 which is constructed by a transparent electrode panel, and a display substrate 204 which converts an input/output signal so as to input/output the resulting signal to/from the controller 124 of the camera body 101. Various types of video and icon display are displayed on the display unit 202, and then are operated by the user via the touch panel 203, so that various types of input/display control can be made.

A detecting unit 260 disposed within the panel unit 105 detects the attitude position of the panel unit 105. The detecting unit 260 transfers an inverted detection signal to the controller 124 of the camera body 101 via the display substrate 204 depending on the detected attitude position of the panel unit 105. The controller 124 performs control for switching the display mode of the panel unit 105 and the recording mode of the external storage device 190 to a normal display mode or an inverted display mode depending on the inverted detection signal.

Figure 8A:
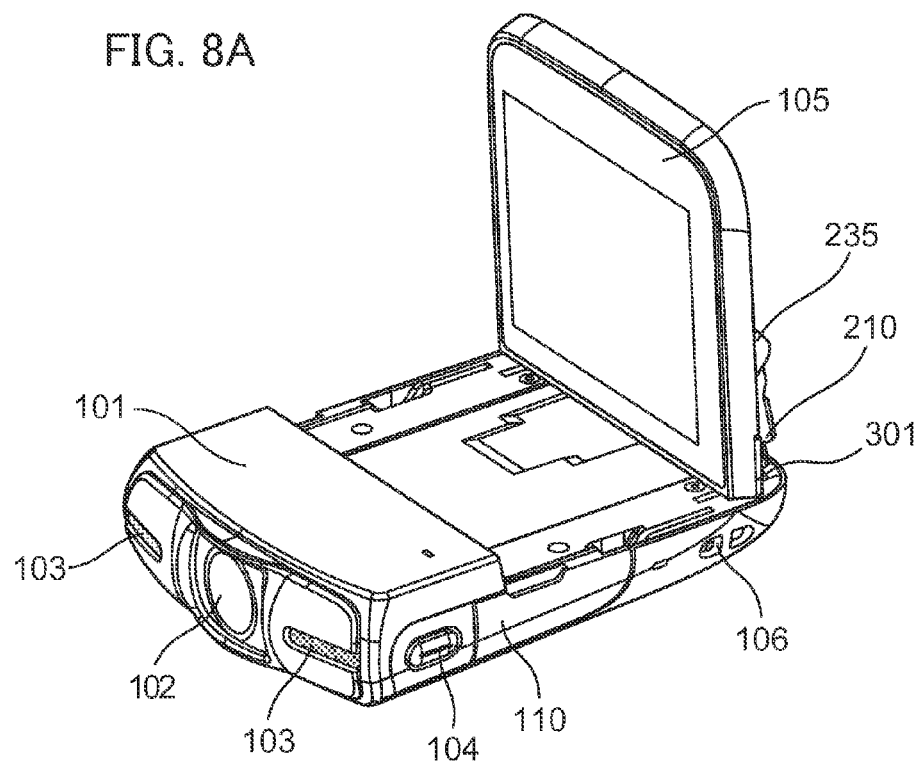
FIG. 8A is a forward perspective view and FIG. 8B is a side view, each illustrating an imaging apparatus in a state where the panel unit thereof is directed forward.
Figure 8B:
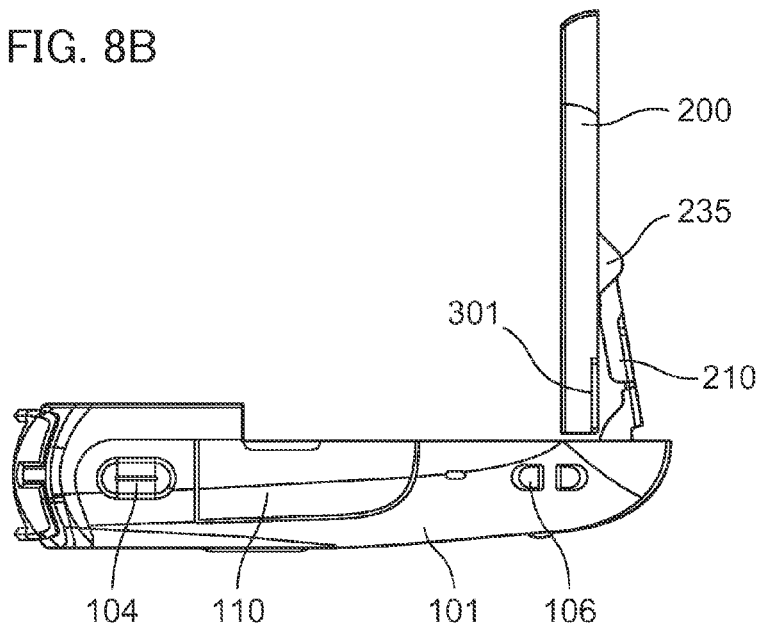
Figure 10:
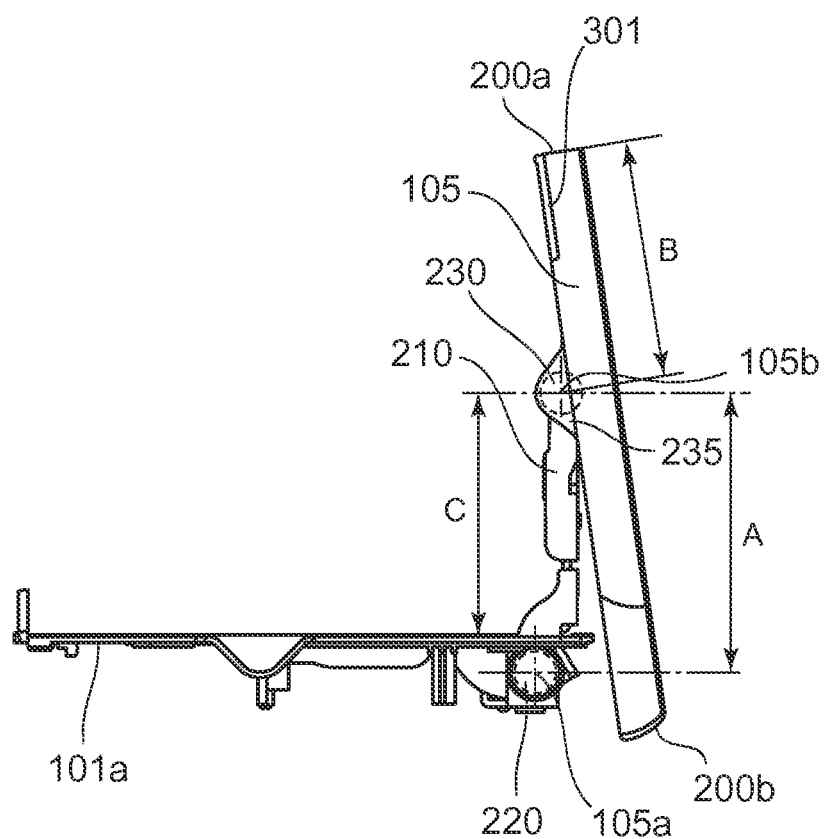
FIG. 10 is a side view illustrating distance relationships in a panel unit.
Figure 11:
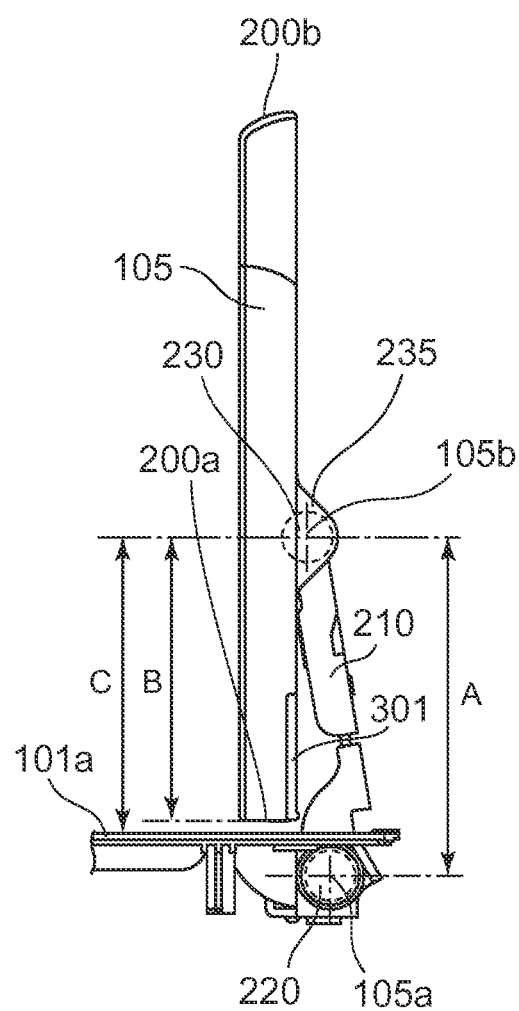
FIG. 11 is a side view illustrating distance relationships in a panel unit.

Next, FIGS. 10 and 11 are diagrams illustrating the panel unit 105, the hinge unit 210, and the storage surface 101a when the imaging apparatus 100 is viewed from the same direction shown in FIGS. 6A and 8B, respectively. Here, the distance between the center of the first rotary shaft 105a of the first connecting portion 220 and the center of the second rotary shaft 105b of the second connecting portion 230 is defined as "A", and the distance between the center of the second rotary shaft 105b of the second connecting portion 230 and the first end 200a of the panel unit 105 is defined as "B". The distance A and the distance B are in a relationship of A>B. Also, the distance between the storage surface 101a of the camera body 101 and the center of the second rotary shaft 105b of the second connecting portion 230 is defined as "C", and the distance B and the distance C are in a relationship of C>B.

As described above, the distance A is set to be longer than the distance B, and the distance C is set to be longer than the distance B. When such settings are made, the panel unit 105 does not interfere with the storage surface 101a of the camera body 101 as shown in FIG. 11 even in the state where the first end 200a of the panel unit 105 is at a position opposing the storage surface 101a of the camera body 101. Thus, as shown in FIG. 10, the panel unit 105 is rotatable until a state where the display surface 201 is directed toward the imaging direction is reached, so that the panel unit 105 is applicable to various types of shooting styles.

While, in the present embodiment, a description has been given by taking an example in which the first rotary shaft 105a of the first connecting portion 220 is disposed in rear (position distant from the image-taking lens 102) of the camera body 101, the present invention is not limited thereto. In other words, the first rotary shaft 105a of the first connecting portion 220 may also be disposed in front (position in close proximity to the image-taking lens 102) of the camera body 101. The second rotary shaft 105b of the second connecting portion 230 may also be disposed at a position distant from the image-taking lens 102 than the first connecting portion 220 in a state where the panel unit 105 is stored in a predetermined position of the camera body 101. In other words, when the imaging apparatus 100 is viewed from the side of the body, the second rotary shaft 105b is located on the side opposite to the panel unit 105 with respect to the center of the display unit. Even in this case, the distance A between the center of the first rotary shaft 105a and the center of the second rotary shaft 105b and the distance B between the center of the second rotary shaft 105b and the first end 200a of the panel unit 105 are arranged to be in a relationship of A>B. In addition, the distance B and the distance C between the storage surface 101a and the center of the second rotary shaft 105b are arranged to be in a relationship of C>B, the same effects as those described above may be obtained.

The main substrate 112 built into the camera body 101 is electrically connected to the display substrate 204 built into the panel unit 105 via a flexible substrate (FPC) 250. The camera body 101 is provided with an opening 158 for the flexible substrate in the vicinity of the first rotary shaft 105a of the first connecting portion 220. The panel unit 105 is provided with an opening 240 for the flexible substrate in the vicinity of the second rotary shaft 105b of the second connecting portion 230. The FPC 250 is arranged to be exposed to an exterior of an imaging apparatus from each of the openings 158 and 240. Here, an FPC guard portion 251 is provided in order to prevent the FPC 250 from being stressed upon pivoting of the panel unit 105. The FPC guard portion 251 is secured to the hinge unit 210. With the aid of the above configuration, the panel unit 105 may be kept in electrical connection with the camera body 101 even when the panel unit 105 is inclined at any angle.

Figure 12:
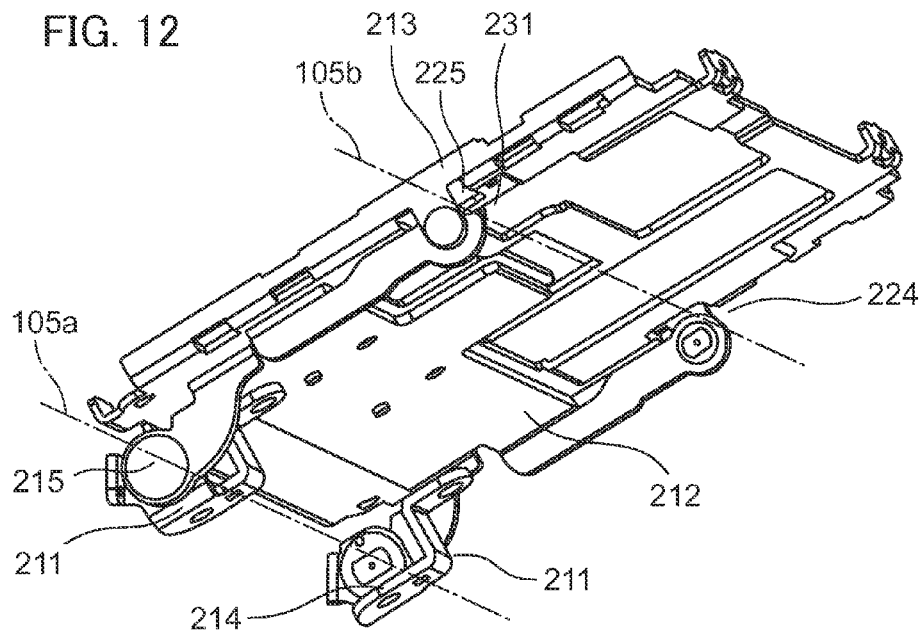
FIG. 12 is a perspective view illustrating the hinge unit of an imaging apparatus.
Figure 13:
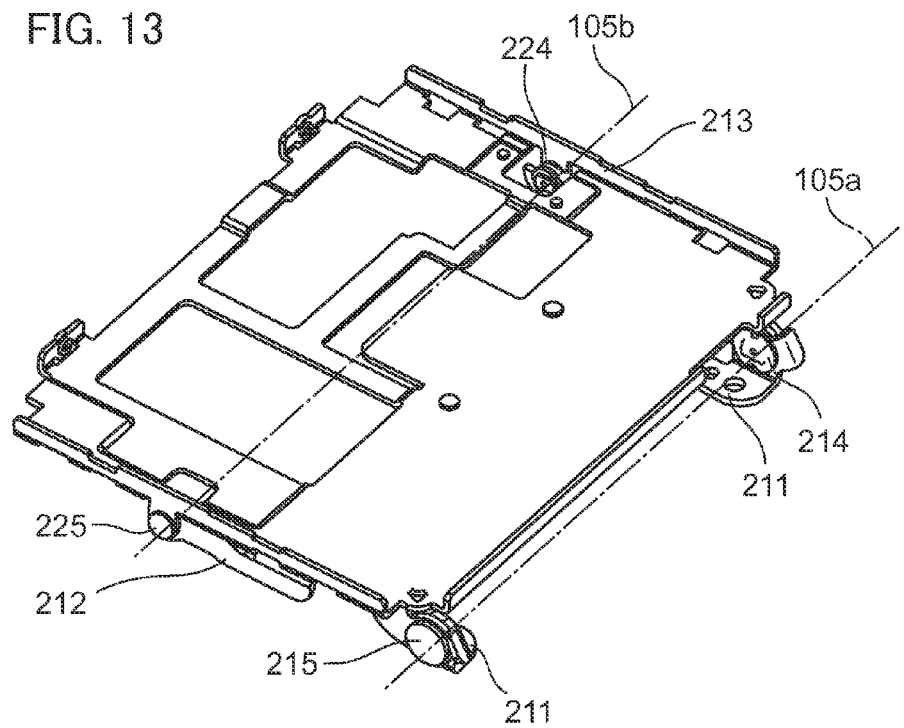
FIG. 13 is a perspective view illustrating the hinge unit of an imaging apparatus.

Each of FIGS. 12 and 13 is a diagram illustrating a configuration of the hinge unit 210. The hinge unit 210 includes a body connecting portion 211 which is connected to the camera body 101, a hinge body 212, and a panel unit connecting portion 213 which is connected to the panel unit 105. The hinge unit 210 also includes a first spring portion 214 which generates a click and a frictional force by an axial force when the panel unit 105 is rotated about the first rotary shaft 105a, and a rotation locking portion 215 which rotatably couples the body connecting portion 211 and the hinge body 212. Furthermore, the hinge unit 210 includes a second spring portion 224 which generates a click and a frictional force by an axial force when the panel unit 105 is rotated about the second rotary shaft 105b, and a rotation locking portion 225 which rotatably couples the panel unit connecting portion 213 and the hinge body 212.

Figure 14:
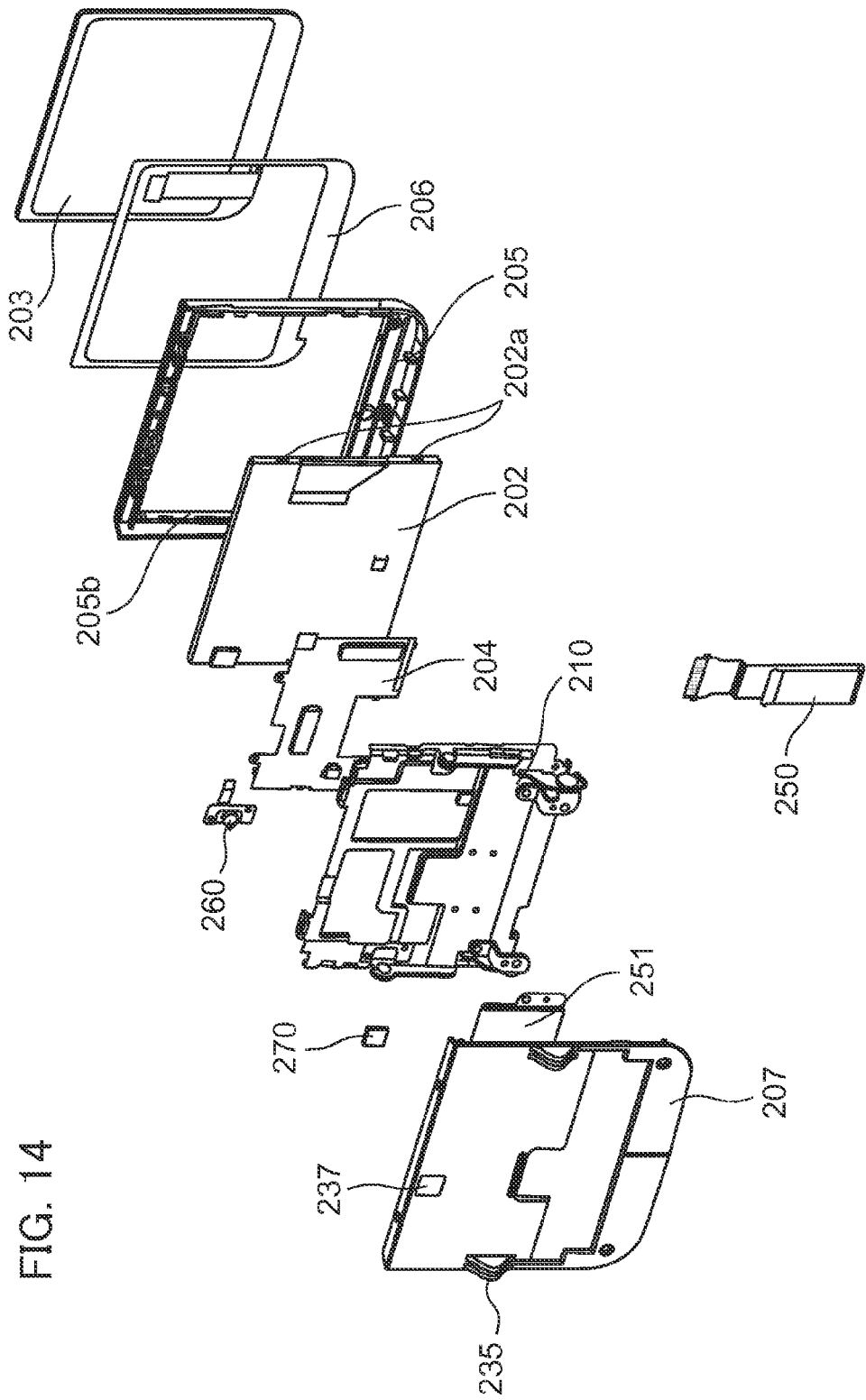
FIG. 14 is an exploded view illustrating the panel unit of an imaging apparatus as obliquely viewed from the panel unit.

FIG. 14 is an exploded perspective view of the panel unit 105. The touch panel 203 is affixed to the touch panel receiving portion of a front cover 205 via an adhesive member 206. The display unit 202 is built into the opening 205b of the front cover 205. Furthermore, a display substrate 204 is disposed behind the display unit 202 and is also electrically connected to the touch panel 203, the display unit 202, the detection switch 260, and the like. The display substrate 204 is also connected to the FPC 250 for electrical connection with the camera body 101. Furthermore, the touch panel 203 is affixed to a rear cover 207 which protects the hinge unit 210 and the rear portion and constitutes the external appearance of the panel unit 105. The panel unit 105 is configured as described above.

Note that a holding magnet 270 for holding the stored state of the panel unit 105 is disposed on the rear of the hinge unit 210. A magnetic body is disposed at a predetermined position on the camera body 101 side opposing the holding magnet 270 in the normally stored state where the panel unit 105 is stored in a predetermined storage position such that the stored state is held by a magnetic force of the holding magnet 270. While, in the present embodiment, a magnetic body 165 is also a holding sheet metal on the body side, the present invention is not limited thereto. Another member may also be used provided that it is disposed in the vicinity of the storage surface 101a of the camera body 101.

Figure 15:
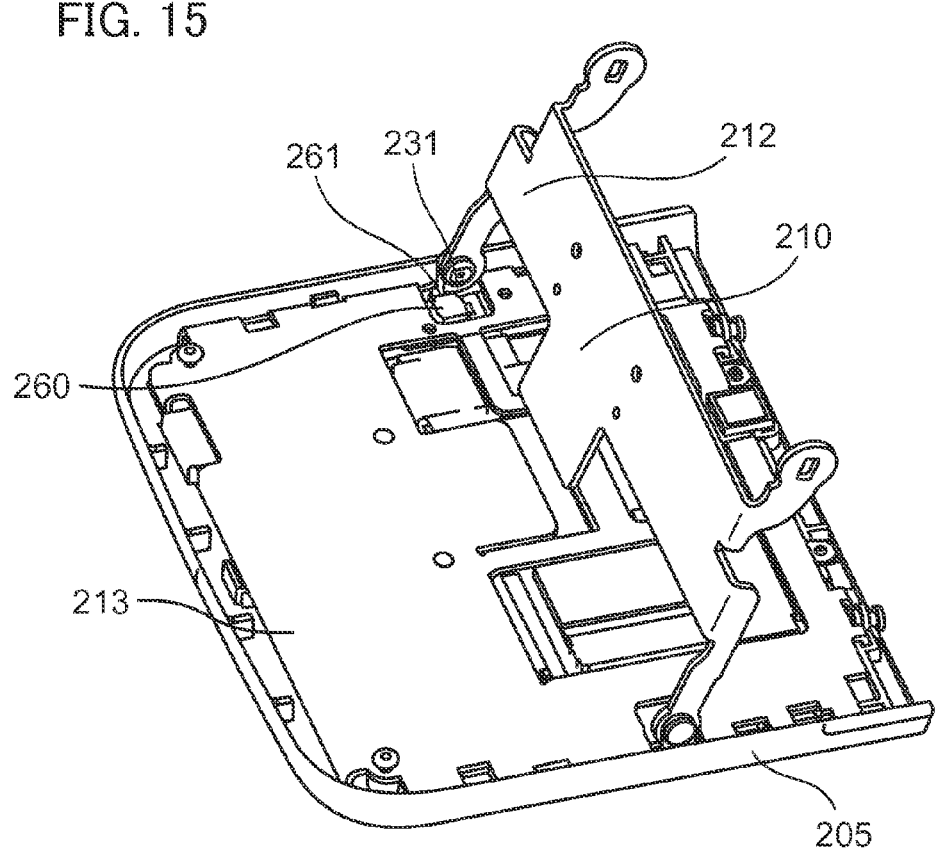
FIG. 15 is a perspective view illustrating a panel unit with part of components excluded therefrom.

FIG. 15 is a perspective view illustrating the panel unit 105 of the present embodiment with the rear cover 207 and the like excluded therefrom. Upon performing self-shooting, the imaging apparatus 100 of the present embodiment performs shooting with the display surface 201 of the panel unit 105 directed toward the shooting direction as shown in FIGS. 7A to 8B. When the display unit 202 is viewed from the operator who performs self-shooting, an image displayed on the display unit 202 is vertically inverted. The display image needs to be vertically inverted by detecting the position of the panel unit 105. In the present embodiment, a detecting unit 260 for detecting the relative position between the panel unit 105 and the hinge unit 210 in order to vertically invert display is built into the panel unit 105. The detecting unit 260 includes a detecting knob 261 and detects the pressing of a switch provided in the detecting unit 260 by the detecting knob 261 so as to control an image to be displayed on the display unit to be inversely displayed.

In order to operate the switch of the detecting unit 260, a claw 231 for pressing the switch is provided on at least one side of the hinge body 212 constituting the second connecting portion 230 among the hinge unit 210. The claw 231 is pivoted together with the hinge body 212, and then the claw 231 presses down on the detecting knob 261. Consequently, the switch of the detecting unit 260 is turned ON, so that control is made to vertically invert a display screen. The detecting knob 261 and the claw 231 are disposed so as to be a suitable positional relationship, and control is made to vertically invert a display image at a desired angle.

Figure 16A:
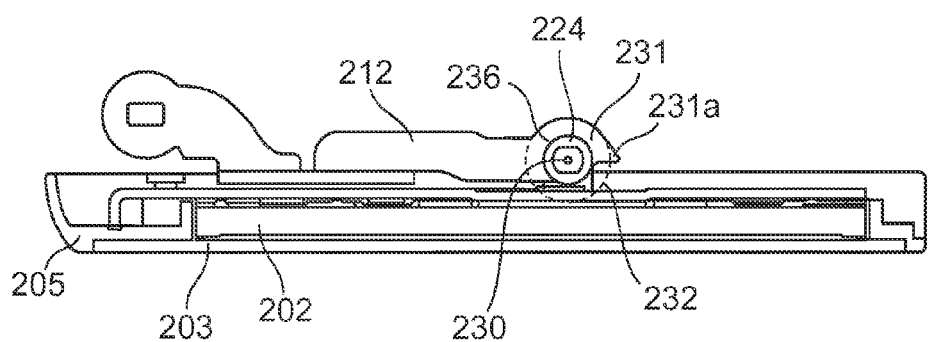
FIG. 16A is a side cross-sectional view and FIG. 16B is a partially enlarged view, each illustrating a panel unit with part of components excluded therefrom.
Figure 16B:
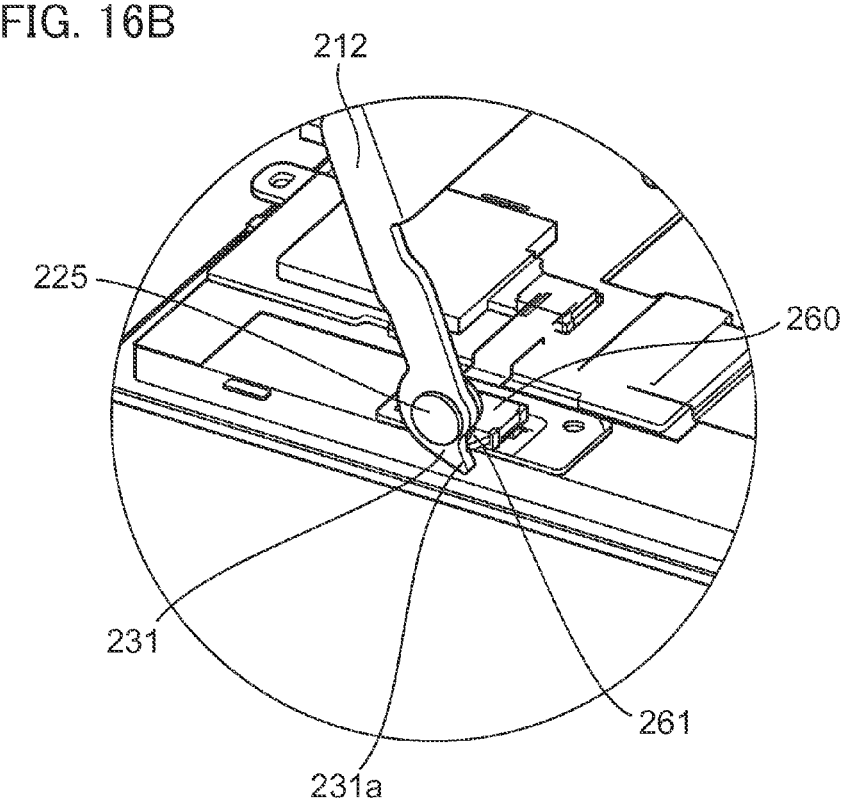

FIG. 16A is a side cross-sectional view illustrating the panel unit 105 of the present embodiment with the rear cover 207 and the like excluded therefrom. FIG. 16B is an enlarged perspective view illustrating an enlarged structure in the vicinity of the detecting unit 260. In the present embodiment, the claw 231 has a projection 231a protruding further than the size of the rotating arc portion 230 of the hinge body 212 indicated by a dotted line. This allows the detecting knob 261 to be pressed by the projection 231a as shown in FIG. 16B even when the rotary shaft diameter 236 of the second connecting portion 230 has a size insufficient to press the detecting knob 261 of the detecting unit 260.

Figure 17A:
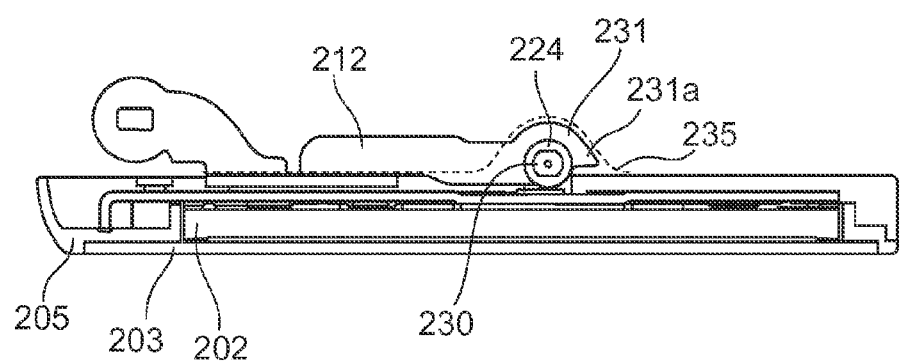
FIGS. 17A and 17B are side cross-sectional views illustrating the hinge cover of a panel unit by a dotted line.
Figure 17B:
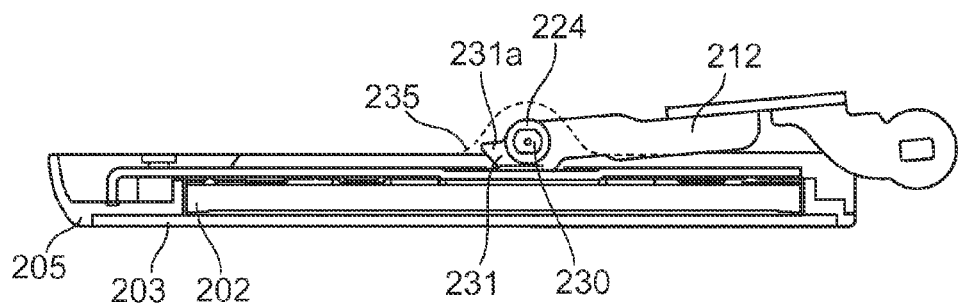

Here, a protecting portion 235 for protecting the second connecting portion 230 by covering therearound is formed on the rear cover 207 of the panel unit 105 of the present embodiment. FIGS. 17A and 17B are side views illustrating the positions of the protecting portion 235 among the panel unit 105 of the present embodiment in the normally stored state and the maximally rotated state indicated by dotted lines, respectively. The skirt of the protecting portion 235 indicated by a dotted line is enlarged in a substantially triangular shape in order to maintain the strength while covering the second connecting portion 230. As shown in FIGS. 17A and 17B, the projection 231a is configured to enter into the panel unit 105 when the panel unit 105 pivots from the normally stored state to the maximally rotated state. In the normally stored state, the projection 231a is stored in a space which is formed by the skirt of the protecting portion 235 in a substantially triangular shape. With this configuration, the projection 231a is disposed at a position and in a direction not projecting from the protecting portion 235 indicated by a dotted line even when the panel unit 105 is at any location in the range where the panel unit 105 pivots relative to the hinge unit 210.

With further advancement of reduction in size of the body as described above, the rotary shaft diameter 236 of the second connecting portion 230 becomes small, and thus, a spring portion 224 which is a resilient member for holding the attitude of the display unit also needs to be reduced in size accordingly. However, as the spring portion 224 is reduced in size, a spring force is decreased, resulting in a reduction in the attitude holding force of the panel unit 105, a reduction in durability in repetitive operation, or an increase in product-to-product variation.

Figure 18A:
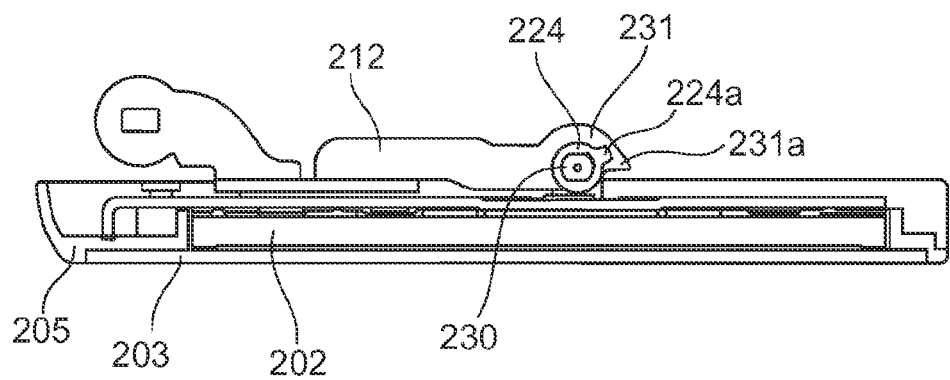
FIGS. 18A and 18B are side cross-sectional views illustrating a panel unit with part of components excluded therefrom.
Figure 18B:
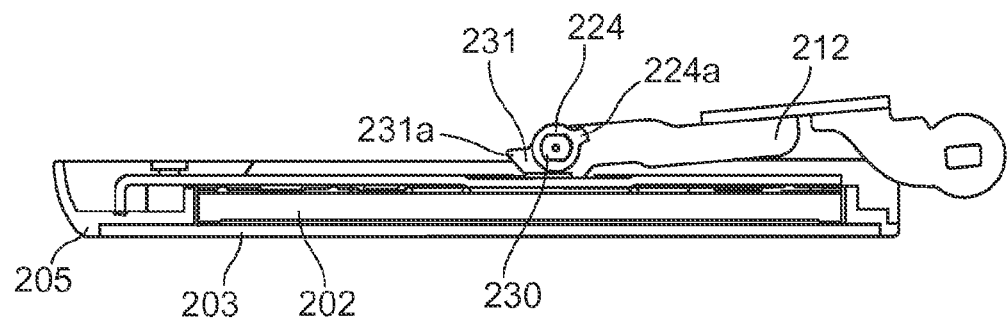

FIGS. 18A and 18B are side views illustrating the panel unit 105 of another embodiment which may solve such a phenomenon with the rear cover 207 and the like excluded therefrom in the normally stored state and the maximally rotated state, respectively. In the present embodiment, a spring projection 224a projected in accordance with the projected shape of the claw 231 is provided as a part of the spring portion 224 serving as a resilient member so as to ensure a spring force by the spring projection 224a, resulting in an increase in durability in repetitive operation and a reduction in variation in feeling of operation. The spring projection 224a is formed inside the rotating arc portion 232 of the hinge body 212, and protrudes more than the rotary shaft diameter 236 of the second connecting portion 230. As shown in FIG. 18A, the spring projection 224a is disposed on the projection 232a side of the claw in the normally stored state, and constantly and continuously imparts a frictional force caused by the spring projection 224a of the spring portion 224 to the rotating arc portion 232 of the hinge body 212 until the state shown in FIG. 18B is reached. In other words, the spring projection 224a serving as a resilient member may constantly bear down the hinge unit 210 within the range where the panel unit 105 pivots relative to the hinge unit 210. Consequently, the display unit can be stably held.

Figure 19:
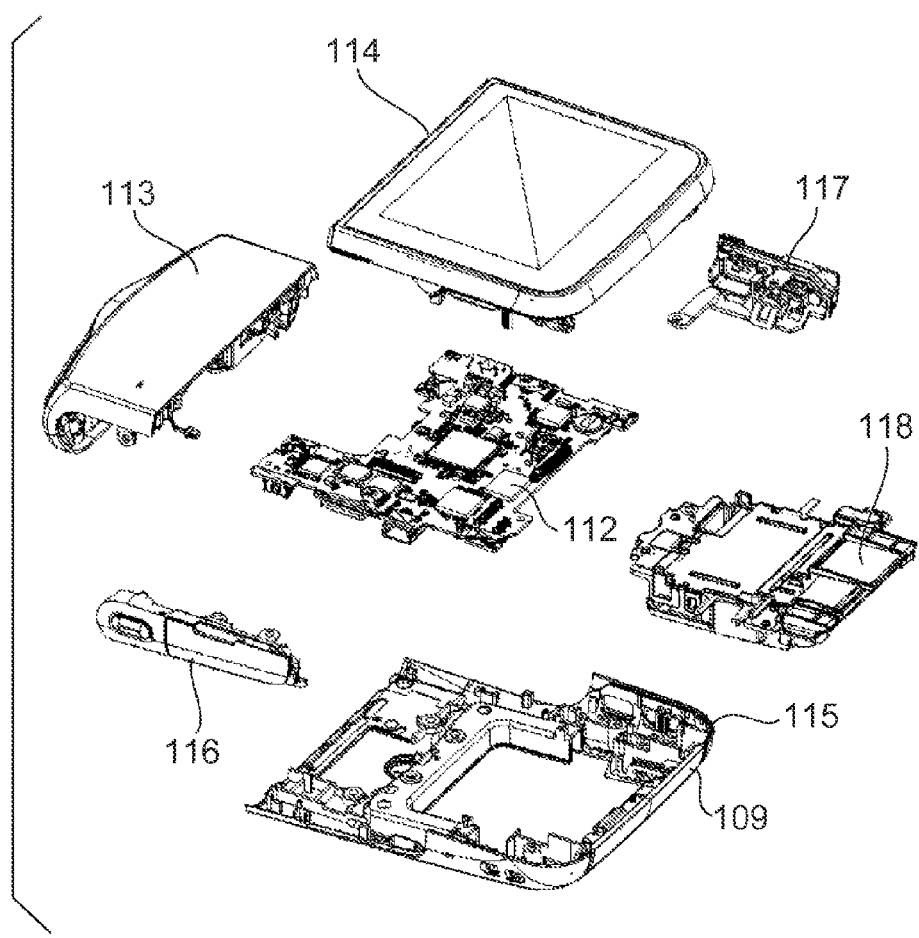
FIG. 19 is an exploded perspective view illustrating an exemplary video camera.

FIG. 19 is an exploded perspective view illustrating an exemplary video camera. The video camera may be decomposed into a main substrate 112, a front cover unit 113, a top cover unit 114, a bottom cover unit 115, a left cover unit 116, a right cover unit 117, and a battery box unit 118. The main substrate 112 includes electric components such as a power supply IC and terminals such as an HDMI (registered trademark), a USB, and the like.

The front cover unit 113 forms the front portion of the video camera. The front cover unit 113 holds the lens 102, a sensor (not shown), and the like. The top cover unit 114 forms the top portion of the video camera. The panel unit 105 is attached to the top cover unit 114. The bottom cover unit 115 forms the rear portion and the bottom portion of the video camera. The battery lid 109 is attached to the bottom cover unit 115. The left cover unit 116 forms the left side portion of the video camera. The release button 104 is provided on the left cover unit 116. The battery box unit 118 holds the inserted battery.

Hereinafter, a description will be given of how the video camera is assembled. Firstly, the main substrate 112 is attached to the front cover unit 113, the left cover unit 116 and the right cover unit 117 are incorporated into the main substrate 112, and then the top cover unit 114 is attached to the main substrate 112. Next, the battery box unit 118 is incorporated into the main substrate 112, and finally the bottom cover unit 115 is incorporated into the top cover unit 114 so as to fit with the outer shape thereof for integration.

Figure 20A:
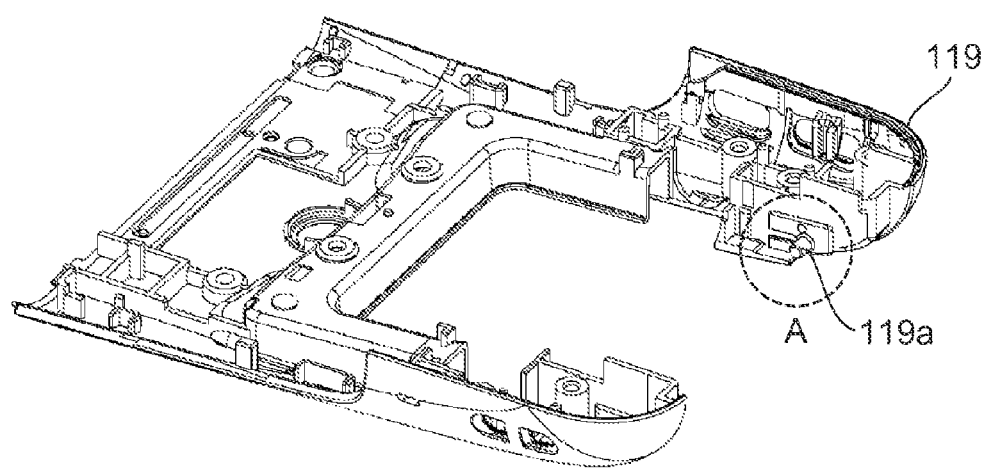
FIGS. 20A and 20B are diagrams illustrating a detailed configuration of a bottom cover.
Figure 20B:
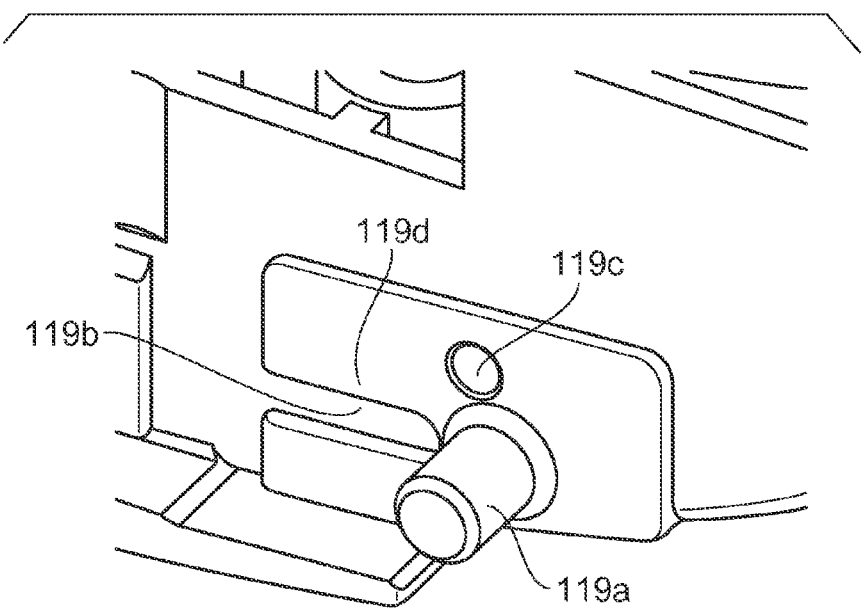
Figure 21:
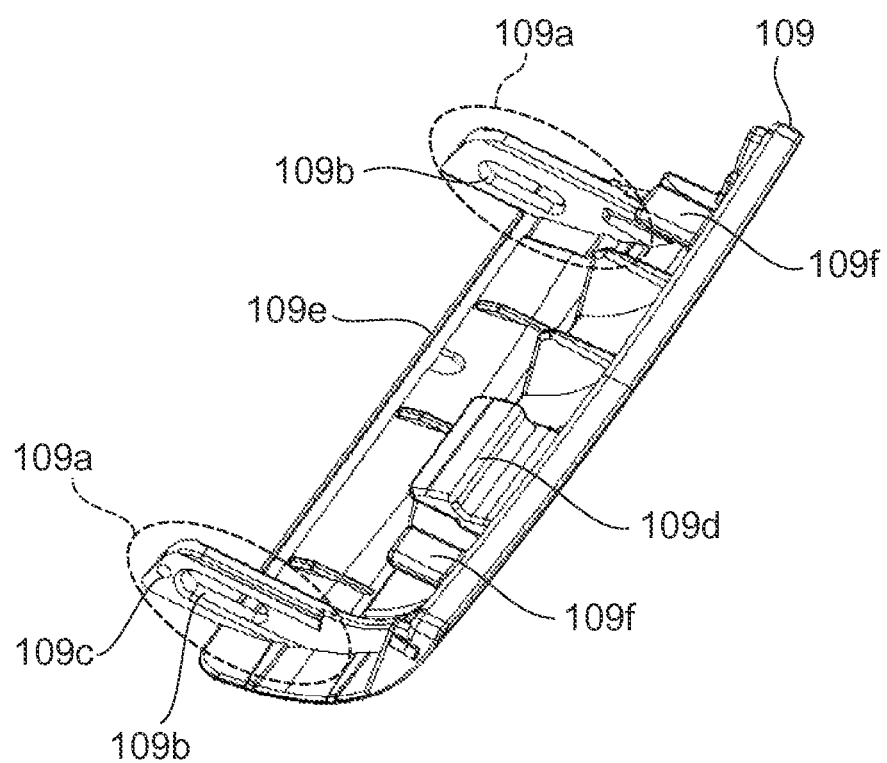
FIG. 21 is a diagram illustrating a detailed configuration of a battery lid.

Next, a description will be given of a detailed configuration of a bottom cover 119 and the battery lid 109 constituting the bottom cover unit 115 with reference to FIGS. 20A, 20B, and 21. FIG. 20A is a perspective view illustrating the bottom cover 119. FIG. 20B is an enlarged view illustrating an enlarged structure around a rotary shaft 119a denoted by reference numeral A in FIG. 20A. FIG. 21 is a perspective view illustrating the battery lid 109.

As shown in FIGS. 20A and 20B, the rotary shaft 119a adapted to engage with the battery lid 109 is provided on the bottom cover 119. A slide groove 119b and a rotation holding groove 119c are provided as grooves around the rotary shaft 119a.

As shown in FIG. 21, the battery lid 109 includes an arm 109a, a shaft hole 109b, an attitude holding projection 109c, a click abutment portion 109d, a stopper 109e, and a claw 109f. The shaft hole 109b and the attitude holding projection 109c are provided on the arm 109a. The shaft hole 109b is formed into an elongated hole and engages with the rotary shaft 119a of the bottom cover 119. The rotary shaft 119a of the bottom cover 119 engages with the shaft hole 109b of the battery lid 109, so that the battery lid 109 is slidably and rotatably supported on the bottom cover 119.

The attitude holding projection 109c engages with the slide groove 119b and the rotation holding groove 119c of the bottom cover 119. The click abutment portion 109d generates a click force when the battery lid 109 is slid. The stopper 109e butts against the battery box unit 118 when the battery lid 109 is opened in the rotational direction. The claw 109f is brought into abutment against the battery box unit 118 so as to hold the attitude of the battery lid 109 in the closed state. Although not illustrated in the drawings, the attitude holding projection 109c, the rotary shaft 119a, the slide groove 119b, and the rotation holding groove 119c are symmetrically provided on two opposite sides.

Figure 22A:
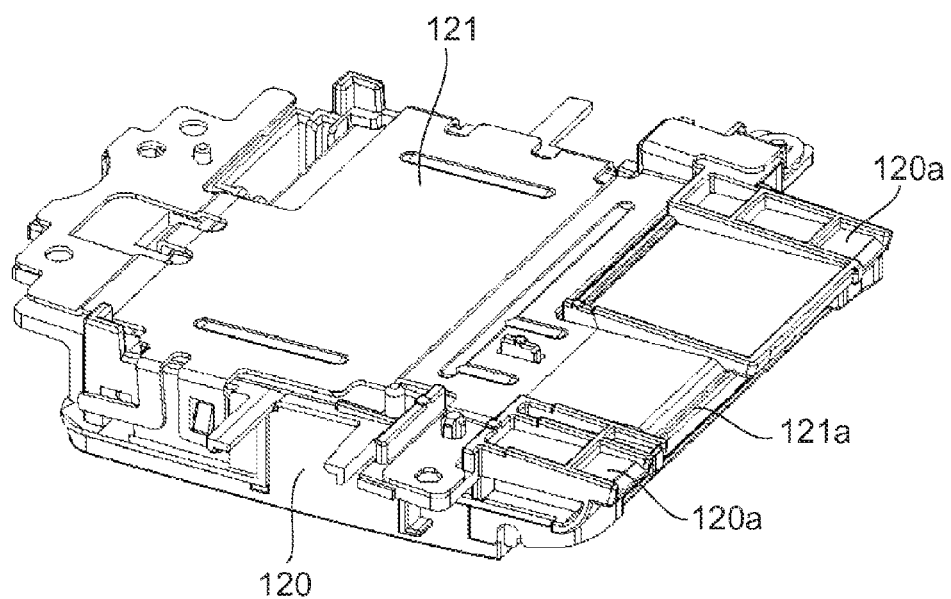
FIGS. 22A and 22B are diagrams illustrating a detailed configuration of a battery box unit.
Figure 22B:
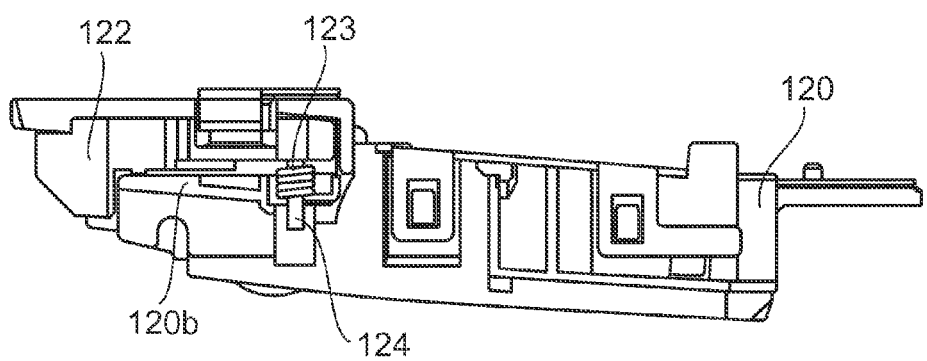

Each of FIGS. 22A and 22B is a diagram illustrating a detailed configuration of a battery box unit 118. FIG. 22A is a perspective view illustrating a front-view configuration of a battery box unit 118. FIG. 22B is a side view illustrating a side-view configuration of the battery box unit 118.

The battery box unit 118 includes a battery box 120, an ejection spring (not shown), a sheet metal 121, a battery lock lever 122, an open-close spring 123, and a shaft 124. The battery box 120 stores a battery. The ejection spring ejects a battery. In other words, the battery box 120 functions as a storage for storing a battery in a state where the battery box unit 118 and the bottom cover unit 115 are assembled to the battery box 120. The battery lid 109 is a lid for opening/closing the opening of the storage. The opening is provided on a surface adjacent to the storage surface 101a (FIG. 5A) of the camera body 101. While, in the present embodiment, the battery box is applied as a storage, the present invention is also applicable to a storage for storing any device which is used by being stored in an electronic apparatus. For example, the storage may also be a memory card storage for storing a memory card.

The sheet metal 121 forms one face of the battery box unit 118. The battery lock lever 122 holds a battery. The open-close spring 123 urges the battery lock lever 122 in a certain direction. The shaft 124 engages with the battery lock lever 122 so as to pivotally support it.

The battery box 120 also includes an abutting surface 120a and a slide rail 120b. The abutting surface 120a is brought into abutment against the claw 109f of the battery lid in a state where the battery lid 109 is closed. The slide rail 120b functions as a guide portion that guides the battery lid 109 upon slide movement of the battery lid 109. The click portion 121a that generates a click force upon slide movement of the battery lid 109 is provided on the sheet metal 121.

Figure 23A:
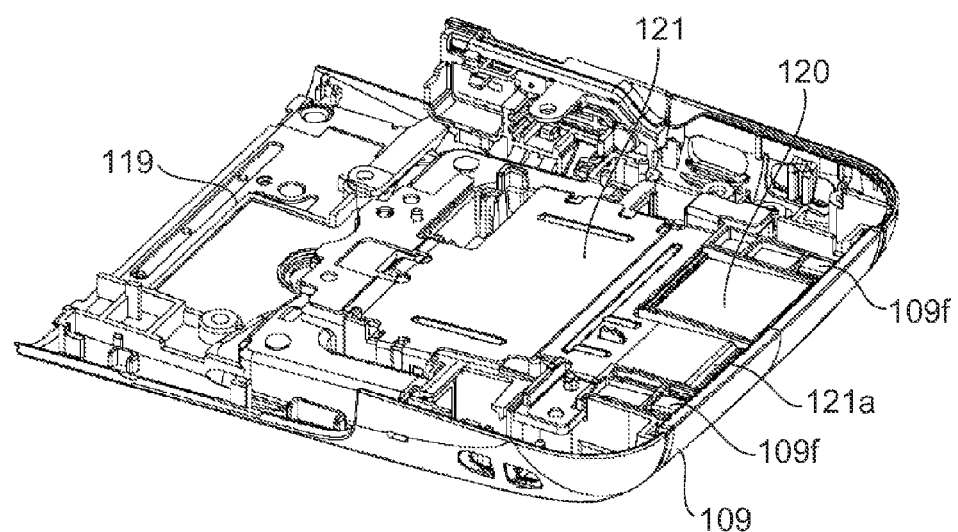
FIGS. 23A and 23B are diagrams illustrating the opening movement of a battery lid.
Figure 23B:
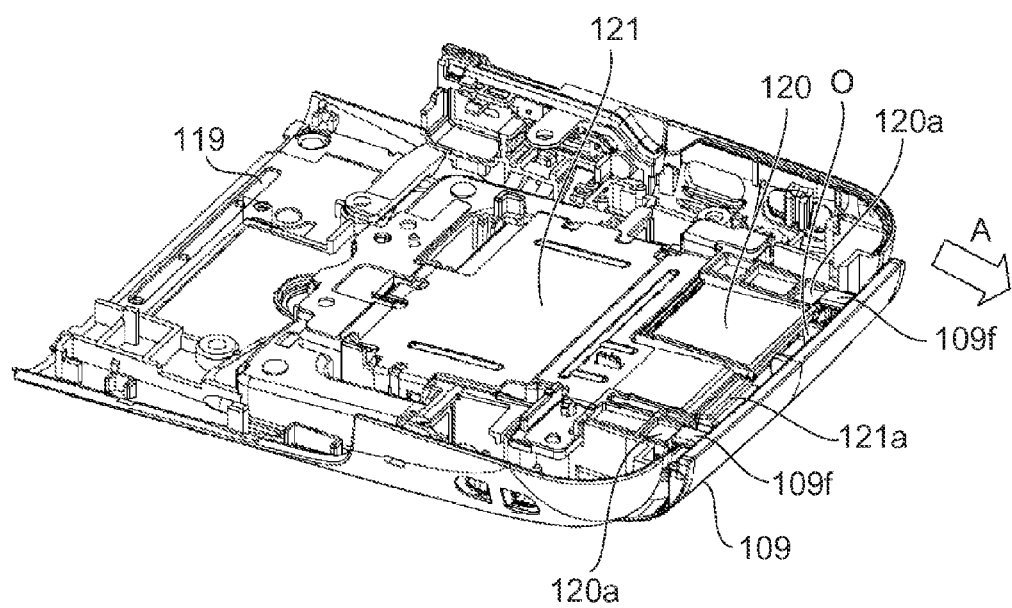
Figure 24:
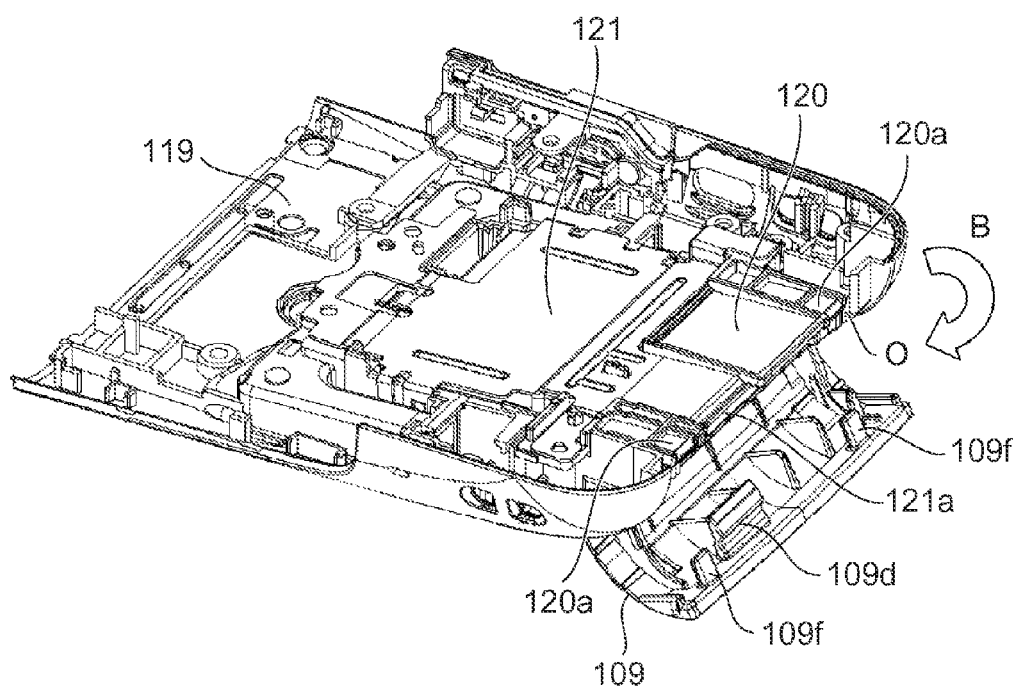
FIG. 24 is a diagram illustrating the opening movement of a battery lid.

FIGS. 23A, 23B, and 24 are diagrams illustrating the opening movement of the battery lid 109. FIG. 23A is a perspective view illustrating the battery lid 109 to which the battery box unit 118 and the bottom cover unit 115 are assembled in the battery lid closed state. FIG. 23B is a diagram illustrating a state where the battery lid 109 has slidably been moved in the direction of arrow A from the battery lid closed state. FIG. 24 is a diagram illustrating a state (battery lid opened state) where the battery lid 109 has been rotated in the direction of arrow B from the state shown in FIG. 23B.

In the battery lid closed state shown in FIG. 23A, the claw 109f is brought into abutment against the abutting surface 120a of the battery box 120 so that the attitude of the battery lid 109 is held. When a force is applied to the battery lid 109 in the direction of arrow A from the battery lid closed state, the click portion 121a rises on the chevron shape of the click abutment portion 109d, so that the battery lid 109 is slidably movable while generating a click force.

The battery lid 109 moves within the range of the elongated hole of the shaft hole 109b which engages with the rotary shaft 119a, so that the battery lid 109 slidably moves with respect to the opening O of the battery box 120. The battery lid 109 rotates about the rotary shaft 119a provided in the bottom cover 119 in the direction of arrow B shown in FIG. 9 from the slide movement end to the rotational movement end at which the stopper 109e of the battery lid 109 butts against the battery box. In this manner, the battery lid 109 opens the opening O of the battery box 120. Consequently, insertion/removal of the battery can be made. In other words, the battery lid 109 pivots with respect to the opening O so as to open/close the opening.

Figure 25A:
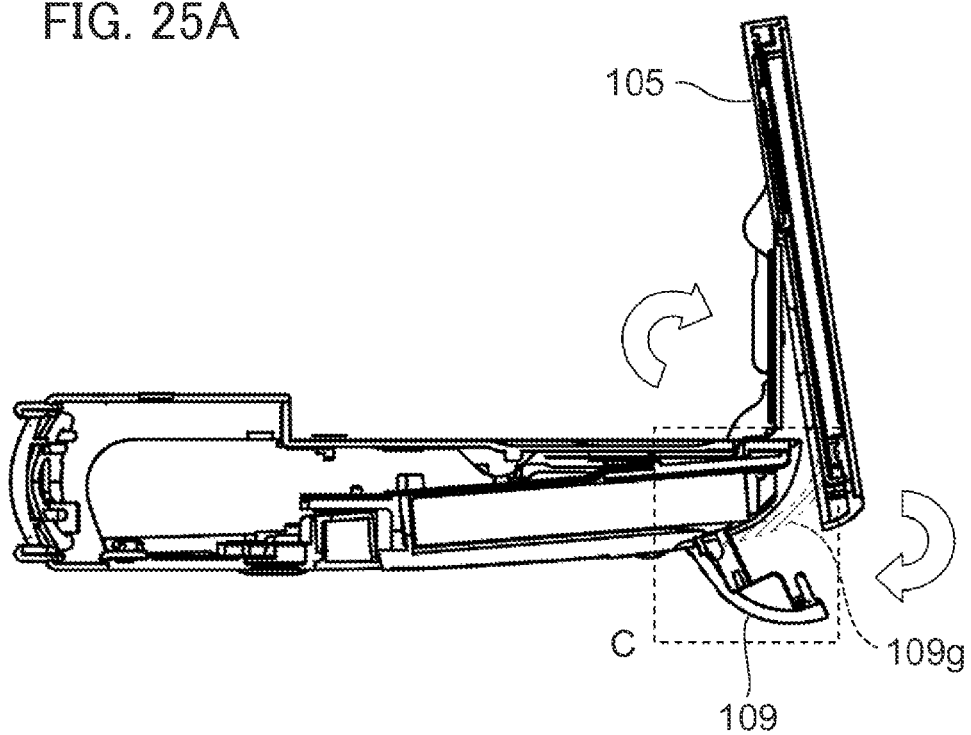
Figure 25B:
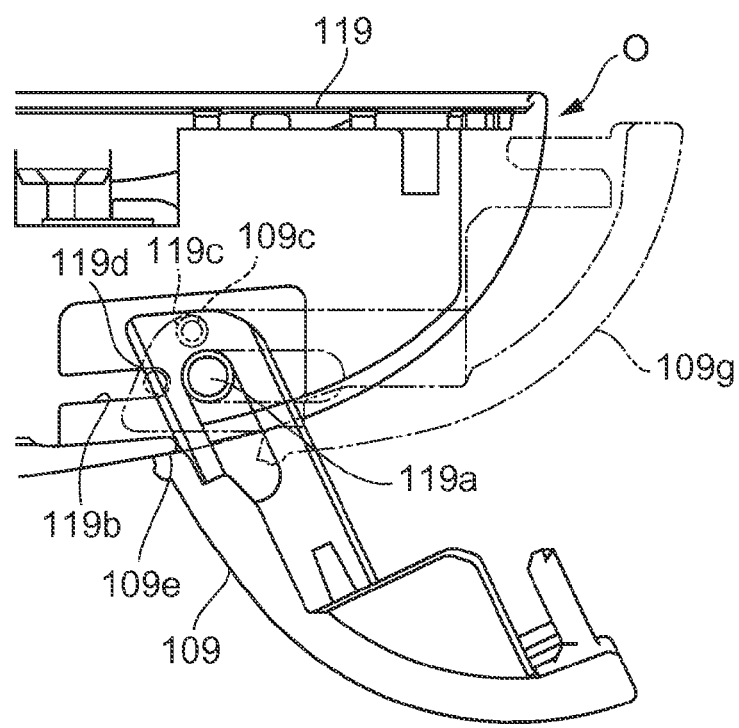

Each of FIGS. 25A and 25B is a diagram illustrating a state where both the battery lid and the panel unit are opened. FIG. 25A is a diagram illustrating a cross section along the optical axis when the battery lid 109 is slid and then the panel unit 105 is pivoted in the arrow direction so as to be in the normal shooting attitude. Reference numeral 109g denotes the position of the battery lid 109 upon slidable movement thereof. The battery lid 109 interferes with the panel unit 105 at its opened state at the position 109g. However, in the present embodiment, after the battery lid 109 has been slidably moved, the battery lid 109 rotates in the same direction as the rotational direction of the panel unit 105. In this manner, even if a part of the panel unit 105 overhangs rearward when the panel unit 105 is in the normal shooting attitude, the battery lid 109 rotates in the same direction as the rotational direction of the panel unit 105, so that the panel unit 105 does not interfere with the position of the battery lid 109 in the battery lid opened state.

In the video camera of the present embodiment, the battery lid 109 does not interfere with the panel unit 105 when the panel unit 105 is in the normal shooting attitude in a state where the opening O is opened by the pivoting of the battery lid 109. In another embodiment, the video camera may also be configured such that the battery lid 109 does not interfere with the panel unit 105 even when the panel unit 105 is in the normal shooting attitude in a state where the opening O is opened by the pivoting of the battery lid 109.

Next, a description will be given of a mechanism for holding the attitude of the battery lid 109 in the opened state. FIG. 25B is an enlarged view of a section C shown in FIG. 25A. In FIG. 25B, only the battery lid 109 and the bottom cover 119 are shown for ease of explanation.

Firstly, when the battery lid 109 is slidably moved from the battery lid closed state, the attitude holding projection 109c of the battery lid 109 moves in the slide groove portion 119b of the bottom cover 119. Next, when the battery lid 109 starts rotational movement from the slide end, the attitude holding projection 109c of the battery lid 109 rides up over the arcuate end portion 119d of the slide groove portion 119b. When the battery lid 109 ends its rotational movement, the stopper 109e of the battery lid 109 butts against the battery box unit 118 while at the same time the attitude holding projection 109c of the battery lid 109 is dropped into and then engages with the rotation holding groove 119c of the bottom cover 119 as shown in FIG. 25B. In this manner, the attitude of the battery lid 109 can be held in the opened state. In other words, the stopper 109e and the attitude holding projection 109c function as a holding mechanism for holding the attitude of the battery lid 109 in the opened state.

Note that a DC coupler (pseudo battery type adaptor) which is of substantially the same configuration as a battery may also be loaded on the battery box 120 instead of the battery such that DC power is supplied from an AC adaptor which converts AC power into DC power to a DC coupler. In this case, an electronic apparatus may be used in a state where the DC coupler is loaded on the battery box 120 without interference of a cable for connecting the DC coupler to the AC adaptor with the battery lid 109 and the panel unit 105.

The electronic apparatus of the present embodiment described above has a structure such that the battery lid 109 escapes even when the panel unit 105 is unintentionally opened in the middle of the open operation of the battery lid 109. In this manner, the battery lid 109 and the panel unit 105 are prevented from being inadvertently damaged or scratched. While the present invention has been described with reference to exemplary embodiments, the present invention is not limited to the above embodiments. Various changes and modifications can be made without departing from the scope of the present invention.

Second Embodiment

FIG. 26 is a functional block configuration diagram of an imaging apparatus according to a second embodiment. In the first embodiment, the detecting unit 260 for inverting display by detecting the attitude of the panel unit 105 is built into the panel unit 105 and the display screen is vertically inverted by detecting the rotation angle of the second connecting portion 230. In contrast, in the present embodiment, a description will be given of a configuration in which the detecting unit 260 is built into the camera body 101. In the present embodiment, a magnetic detecting element 159 is provided within the camera body 101 as the detecting unit 260, the position of the panel unit 105 is detected by using the magnetic detecting element 159.

Figure 27:
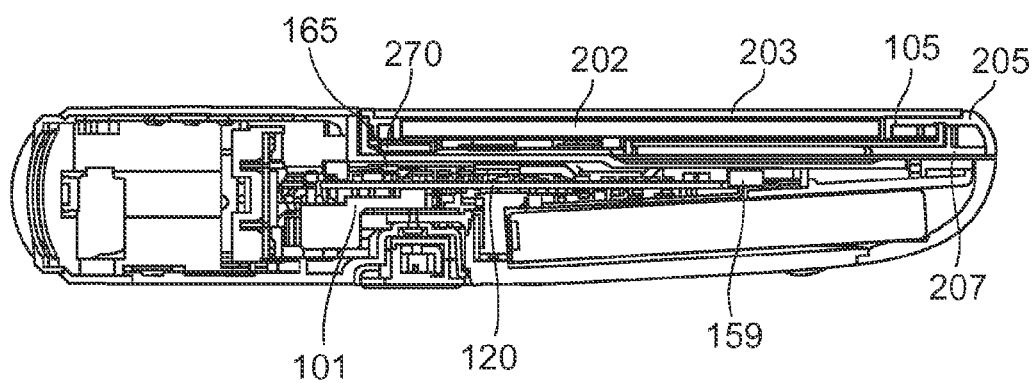
FIG. 27 is a cross-sectional view illustrating an imaging apparatus in a normally stored state.

FIG. 27 is side cross-sectional view illustrating the imaging apparatus of the present embodiment. As shown in FIG. 27, the holding magnet 270 which is a magnetic field generating unit for holding the normally stored state is disposed on the rear cover 207 of the panel unit 105 on the side close to the image-taking lens 102 in its normally stored state. The magnetic body 165 is disposed at a position opposed to the holding magnet 270 in the normally stored state of the panel unit 105 in the camera body 101. The arrangement of the holding magnet 270 and the magnetic body 165 may prevent the panel unit 105 from being inadvertently opened in the normally stored state. Note that the magnetic field generating unit may not necessarily be a magnet as long as it generates a magnetic field.

The controller 124 detects the attitude or the position of the panel unit 105 based on the output of the magnetic detecting element 159 so as to perform display judgment control. The magnetic detecting element 159 detects the approach or the movement of the panel unit 105 by capturing the strength and variation of the magnetic field generated by the holding magnet 270 in the panel unit 105. As the magnetic detecting element 159, a known technique for utilizing a mechanism for changing an output voltage depending on the change in magnetic flux density may also be used. For example, a Hall element utilizing the Hall-effect for generating an electromotive force by the interaction between the magnetic field and the current or various types of magnetoresistive elements whose electric resistance value varies depending on the strength of the magnetic field may also be used.

Figure 28A:
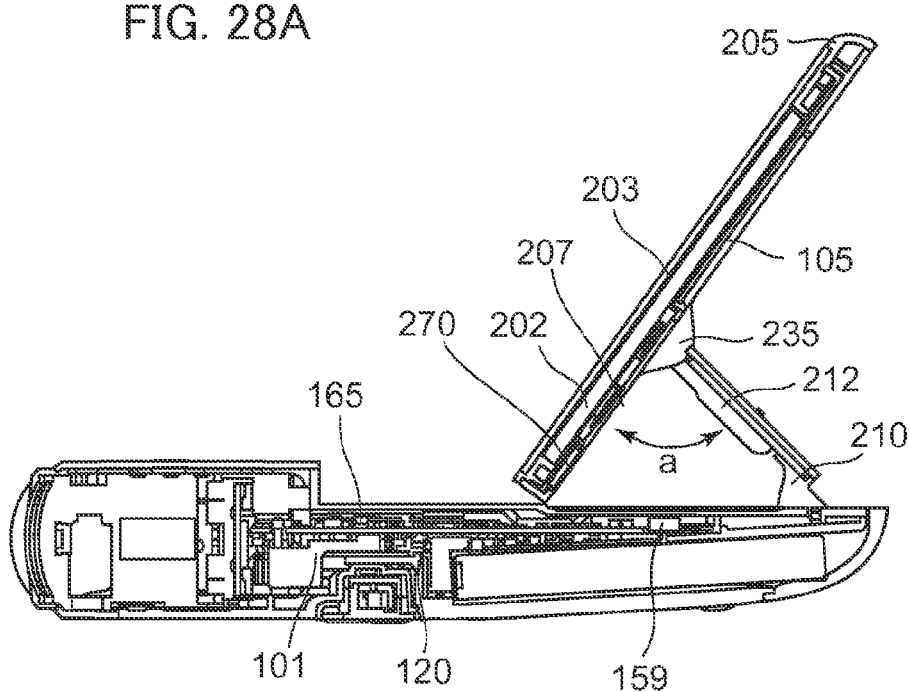
FIGS. 28A and 28B are side cross-sectional views illustrating an imaging apparatus.
Figure 28B:
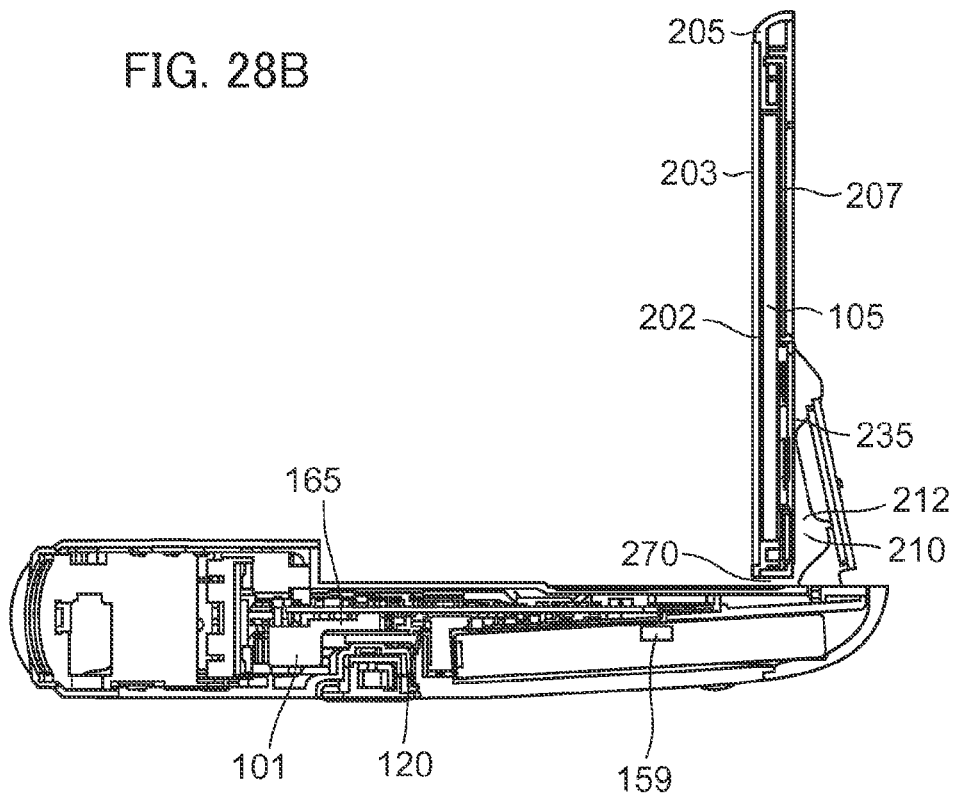

Each of FIGS. 28A and 28B is a side cross-sectional view illustrating an imaging apparatus of the present embodiment in a state where the display surface 201 of the panel unit 105 is directed to the shooting direction. FIG. 28A shows a state where the panel unit 105 is in close proximity to the storage surface 101a of the camera body 101 at an angle of α which is formed between the panel unit 105 and the hinge body 212. FIG. 28B shows a state where the panel unit 105 is rotated such that the display surface 201 of the panel unit 105 is substantially perpendicular to the top surface of the camera body 101. The magnetic detecting element 159 is disposed at an intermediate position between the position of the holding magnet 270 of the panel unit 105 shown in FIG. 28A and the position of the holding magnet 270 in the panel unit 105 shown in FIG. 28B in the vicinity of the storage surface 101a in the camera body 101. In other words, the magnetic detecting element 159 is disposed at an intermediate position of the attitude range of the panel unit 105 which is switched to the inverted display mode by the controller 124.

The magnetic detecting element 159 is disposed at such a position with the detection sensitivity thereof set to a suitable level so as to perform the following control. In other words, the magnetic detecting element 159 controls a screen displayed on the panel unit 105 to be vertically inverted when the panel unit 105 is in close proximity to the storage surface 101a of the camera body 101 at an angle of α or less which is formed between the panel unit 105 and the hinge body 212. Even when the panel unit 105 is in close proximity to the storage surface 101a of the camera body 101, the magnetic detecting element 159 can control an image to be displayed on the panel unit 105 not to be inversely displayed if an angle formed between the panel unit 105 and the hinge body 212 is greater than α.

Figure 29:
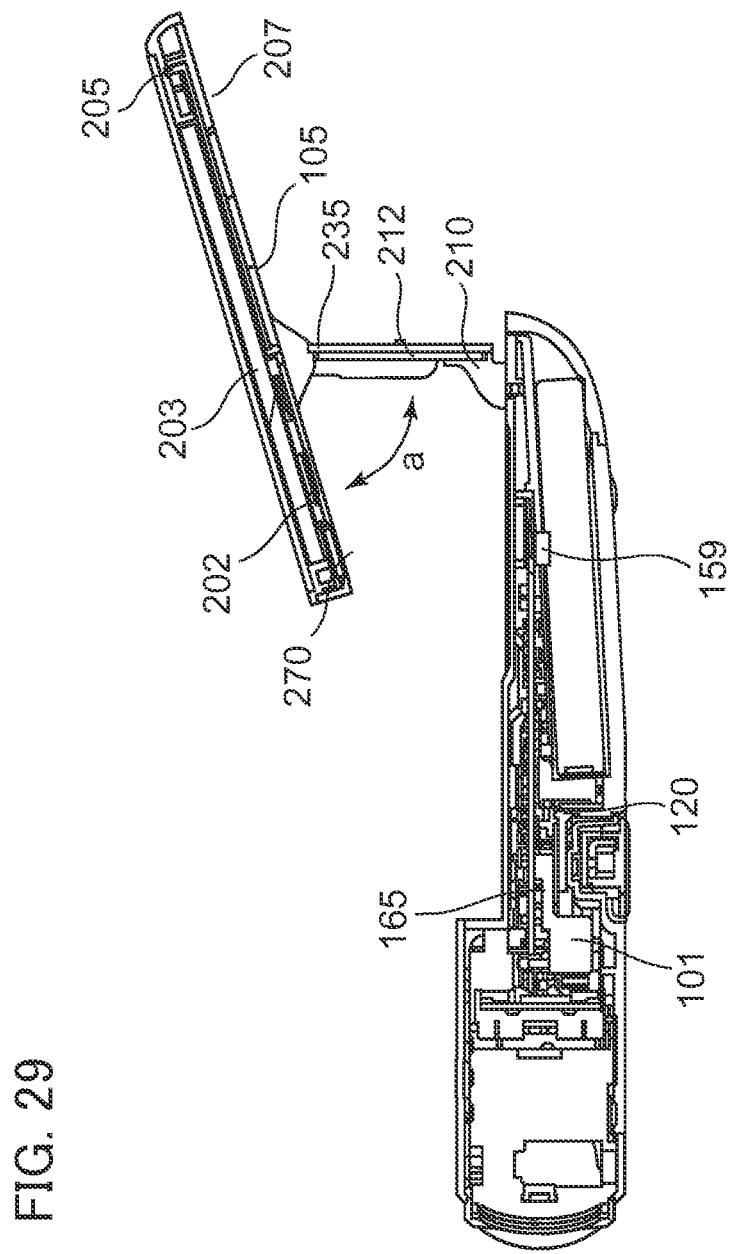
FIG. 29 is a side cross-sectional view illustrating an imaging apparatus.

FIG. 29 is a side cross-sectional view illustrating a state where the panel unit 105 is pivoted upward at an angle of α which is formed between the panel unit 105 and the hinge body 212. In the state where the panel unit 105 is largely distant from the storage surface 101a of the camera body 101 as shown in FIG. 29, the magnetic detecting element 159 does not detect the magnetic field generated by the holding magnet 270. In other words, control can be made so as not to inversely display an image in the state shown in FIG. 29.

Note that, when the magnetic detecting element 159 is mounted on the main substrate 112 which is a main substrate disposed in the body, the position of the panel unit 105 can be detected at low cost with accuracy without occurrence of any additional substrate or the like.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application Nos. 2013-137846 filed on Jul. 1, 2013 and 2013-149671 filed on Jul. 18, 2013, which are hereby incorporated by reference herein in their entirety.

What is claimed is:
1. An electronic apparatus comprising:
   a body having a first surface and a second surface adjacent to the first surface, the second surface being provided with an opening;
   a display unit having a display surface and configured to be pivotable with respect to the body between first and second use positions, in which an image is displayed on the display surface, and a storage position, in which the display unit contacts the first surface; and
   a lid configured to be pivotable with respect to the body between a close position in which the opening is closed and an open position in which the opening is opened,
   wherein the display unit overhangs the second surface by pivoting from the storage position to the first use position, and the lid in the open position does not interfere with the display unit in the first use position.
2. The electronic apparatus according to claim 1, wherein the lid rotates in the same direction as the rotational direction of the display unit in a case where the display unit overhangs the second surface so as to move to the first use position.

3. The electronic apparatus according to claim 1, wherein the lid is slidably movable relative to the body and rotates at a slide movement end so as to open the opening.

4. The electronic apparatus according to claim 3, wherein the body comprises a guide portion that guides the lid during slide movement of the lid.

5. The electronic apparatus according to claim 3, wherein the lid has a holding mechanism that holds the attitude of the lid in a state where the opening is opened by the rotation of the lid at the slide movement end.

6. The electronic apparatus according to claim 5, wherein the holding mechanism has a contacting portion provided in the lid which is contacted to the body in the state where the opening is opened, and a projection which engages with a groove provided in the body in the state where the opening is opened.

7. The electronic apparatus according to claim 3, wherein the body comprises a click unit that generates a click force upon slide movement of the lid relative to the body.

8. The electronic apparatus according to claim 1, wherein the opening is provided for a storage section that stores at least a battery.

9. An imaging apparatus functioning as the electronic apparatus according to claim 1.

* * * * *